(12) United States Patent
Ovshinsky et al.

(10) Patent No.: US 6,372,377 B1
(45) Date of Patent: Apr. 16, 2002

(54) MECHANICAL AND THERMAL IMPROVEMENTS IN METAL HYDRIDE BATTERIES, BATTERY MODULES AND BATTERY PACKS

(75) Inventors: Stanford R. Ovshinsky, Bloomfield Hills; Dennis A. Corrigan, Troy; Srinivasan Venkatesan, Southfield; Subhash K. Dhar; Arthur Holland, both of Bloomfield Hills; Donn Fillmore, Waterford; Lin Higley, Troy, all of MI (US); Philippe Gow, Windsor, CA (US); Ronald Himmler, Sterling Heights, MI (US); Nick Karditsas, Lincoln Park, MI (US); Kenneth Laming, Columbus, MI (US); Anthony Osgood, Lake Orion, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/264,116

(22) Filed: Mar. 8, 1999

Related U.S. Application Data

(60) Division of application No. 08/544,223, filed on Jan. 18, 1996, now Pat. No. 5,879,831, which is a continuation-in-part of application No. 08/140,933, filed on Oct. 25, 1993, now Pat. No. 5,472,802.

(51) Int. Cl.[7] ...................... H01M 10/02; H01M 10/34; H01M 10/50
(52) U.S. Cl. ........................ 429/66; 429/54; 429/120; 429/159; 429/161; 429/175
(58) Field of Search ............................ 429/37, 54, 66, 429/120, 148, 158, 159, 161, 175

(56) References Cited

U.S. PATENT DOCUMENTS 3,834,945 A * 9/1974 Jensen
5,258,242 A * 11/1993 Dean et al.

* cited by examiner

Primary Examiner—Stephen Kalafut
(74) Attorney, Agent, or Firm—David W. Schumaker; Marvin S. Siskind

(57) ABSTRACT

Mechanically and thermally improved rechargeable batteries and modules. The battery is prismatic in shape with an optimized thickness to width to height aspect ratio which provides the battery with balanced optimal properties when compared with prismatic batteries lacking this optimized aspect ratio. The optimized thickness, width and height allow for maximum capacity and power output, while eliminating deleterious side affects. The battery case design allows for unidirectional expansion which is readily compensated for by applying external mechanical compression counter to that direction. In the module, the batteries are bound within a module bundling/compression means under external mechanical compression which is optimized to balance outward pressure due to expansion and provide additional inward compression to reduce the distance between the positive and negative electrodes, thereby increasing overall battery power. Finally the batteries, modules and packs thereof can also include means for providing variable thermal insulation to at least that portion of the rechargeable battery system which is most directly exposed to ambient thermal conditions, so as to maintain the temperature of the rechargeable battery system within the desired operating range thereof under variable ambient conditions.

49 Claims, 18 Drawing Sheets

MECHANICAL AND THERMAL IMPROVEMENTS IN METAL HYDRIDE BATTERIES, BATTERY MODULES AND BATTERY PACKS

RELATED APPLICATIONS

This application is a divisional of U.S. patent application Ser. No. 08/544,223, filed Jan. 18, 1996, now U.S. Pat. No. 5,879,831, which is a continuation-in-part of U.S. patent application Ser. No. 08/140,933, filed Oct. 25, 1993, now U.S. Pat. No. 5,472,802.

FIELD OF THE INVENTION

The present invention relates generally to improvements for metal hydride batteries, battery modules made therefrom and battery packs made from the modules. More specifically, this invention relates to mechanical and thermal improvements in battery design, battery module design, and battery pack design.

BACKGROUND OF THE INVENTION

Rechargeable prismatic batteries are used in a variety of industrial and commercial applications such as fork lifts, golf carts, uninterruptible power supplies, and electric vehicles.

Rechargeable lead-acid batteries are presently the most widely used type of battery. Lead-acid batteries are a useful power source for starter motors for internal combustion engines. However, their low energy density, about 30 Wh/kg, and their inability to reject heat adequately, makes them an impractical power source for an electric vehicle. An electric vehicle using lead acid batteries has a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel metal hydride batteries ("Ni—MH batteries") are far superior to lead acid batteries, and Ni—MH batteries are the most promising type of battery available for electric vehicles. For example, Ni—MH batteries, such as those described in copending U.S. patent application Ser. No. 07/934,976 to Ovshinsky and Fetcenko, now U.S. Pat. No. 5,277,999, the disclosure of which is incorporated herein by reference, have a much better energy density than lead-acid batteries, can power an electric vehicle over 250 miles before requiring recharge, can be recharged in 15 minutes, and contain no toxic materials. Electric vehicles using Ni—MH batteries will have exceptional acceleration, and a battery lifetime of more than about 100,000 miles.

Extensive research has been conducted in the past into improving the electrochemical aspects of the power and charge capacity of Ni—MH batteries, which is discussed in detail in U.S. Pat. Nos. 5,096,667 and 5,104,617 and U.S. patent application Ser. Nos. 07/746,015 and 07/934,976 (now U.S. Pat. Nos. 5,238,756 and 5,277,999, respectively). The contents of all these references are specifically incorporated by reference.

Initially Ovshinsky and his team focused on metal hydride alloys that form the negative electrode. As a result of their efforts, they were able to greatly increase the reversible hydrogen storage characteristics required for efficient and economical battery applications, and produce batteries capable of high density energy storage, efficient reversibility, high electrical efficiency, efficient bulk hydrogen storage without structural changes or poisoning, long cycle life, and repeated deep discharge. The improved characteristics of these "Ovonic" alloys, as they are now called, results from tailoring the local chemical order and hence the local structural order by the incorporation of selected modifier elements into a host matrix. Disordered metal hydride alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage materials were formulated, based on the disordered materials described above. These are the Ti—V—Zr—Ni type active materials such as disclosed in U.S. Pat. No. 4,551,400 ("the '400 Patent") to Sapru, Hong, Fetcenko, and Venkatesan, the disclosure of which is incorporated by reference. These materials reversibly form hydrides in order to store hydrogen. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys are also used for rechargeable hydrogen storage negative electrodes. One such family of materials are those described in U.S. Pat. No. 4,728,586 ("the '586 Patent") to Venkatesan, Reichman, and Fetcenko, the disclosure of which is incorporated by reference. The '586 Patent describes a specific sub-class of these Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

In contrast to the Ovonic alloys described above, the older alloys were generally considered "ordered" materials that had different chemistry, microstructure, and electrochemical characteristics. The performance of the early ordered materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference).

Simply stated, in all metal-hydride alloys, as the degree of modification increases, the role of the initially ordered base alloy is of minor importance compared to the properties and disorder attributable to the particular modifiers. In addition, analysis of the present multiple component alloys available on the market and produced by a variety of manufactures indicates that these alloys are modified following the guidelines established for Ovonic alloy systems. Thus, as stated above, all highly modified alloys are disordered materials characterized by multiple components and multiple phases, i.e. Ovonic alloys.

Clearly, the introduction of Ovonic alloying techniques has made significant improvements in the active electrochemical aspects of Ni—MH batteries. However, it should be noted that until recently the mechanical and thermal aspects of the performance of Ni—MH batteries have been neglected.

For example, in electric vehicles, the weight of the batteries is a significant factor because battery weight is the largest component of the weight of the vehicle. For this reason, reducing the weight of individual batteries is a significant consideration in designing batteries for electric powered vehicles. In addition to reducing the weight of the batteries, the weight of battery modules must be reduced, while still affording the necessary mechanical requirements of a module (i.e. ease of transport, ruggedness, etc.). Also, when these battery modules are incorporated into battery pack systems (such as for use in electric vehicles) the battery pack components must be as light weight as possible.

It should be particularly noted that electric vehicle applications introduce a critical requirement for thermal management. This is because individual cells are bundled together in close proximity and many cells are electrically and thermally connected together. Therefore, since there is an inherent tendency to generate significant heat during charge and discharge, a workable battery design for electric vehicles is judged by whether or not the generated heat is sufficiently controlled.

Sources of heat are primarily threefold. First, ambient heat due to the operation of the vehicle in hot climates. Second, resistive or $I^2R$ heating on charge and discharge, where I represents the current flowing into or out of the battery and R is the resistance of the battery. Third, a tremendous amount of heat is generated during overcharge due to gas recombination.

While the above parameters are generally common to all electrical battery systems, they are particularly important to nickel-metal hydride battery systems. This is because Ni—MH has such a high specific energy and the charge and discharge currents are also high. For example, to charge a lead-acid battery in one hour, a current of 35 Amps may be used while recharge of a Ni—MH battery may utilize 100 Amps for the same one-hour recharge. Second, because Ni—MH has an exceptional energy density (i.e. the energy is stored very compactly) heat dissipation is more difficult than lead-acid batteries. This is because the surface-area to volume ratio is much smaller than lead-acid, which means that while the heat being generated is 2.5-times greater for Ni—MH batteries than for lead acid, the heat dissipation surface is reduced.

The following illustrative example is useful in understanding the thermal management problems faced when designing Ni—MH battery packs for electric vehicles. In U.S. Pat. No. 5,378,555 to General Motors (herein incorporated by reference), an electric vehicle battery pack using lead acid batteries is described. The battery pack system, utilizing lead-acid batteries, has a capacity of about 13 kWh, weighs about 800 pounds, and has a vehicle range of about 90 miles. By replacing the lead-acid battery pack by an Ovonic battery pack of the same size, the capacity is increased to 35 kWh and vehicle range is extended to about 250 miles. One implication of this comparison is that in a 15 minute recharge, the power supplied to the Ni—MH battery pack is 2.7 times greater than that supplied to the lead-acid battery pack, with its commensurate added heat. However, the situation is somewhat different during discharge. To power a vehicle on the highway at constant speed, the current draw upon the battery is the same whether it is a Ni—MH battery or a lead-acid battery (or any other power source for that matter). Essentially the electric motor which drives the vehicle does not know or care where it gets the energy or what type of battery supplies the power. The difference between the heating of the Ni—MH battery and the lead-acid battery upon discharge is the length of discharge. That is, since the Ni—MH battery will drive the vehicle 2.7 times farther than the lead-acid, it has a much longer time before it has a chance to "cool-off".

Further, while the heat generated during charging and discharging Ni—MH batteries is normally not a problem in small consumer batteries or even in larger batteries when they are used singly for a limited period of time, large batteries that serve as a continual power source, particularly when more than one is used in series or in parallel, such as in a satellite or an electric vehicle, do generate sufficient heat on charging and discharging to affect the ultimate performance of the battery modules or battery pack systems.

Thus, there exists a need in the art for battery, battery module, and battery pack system designs which reduces the overall weight thereof and incorporates the necessary thermal management needed for successful operation in electric vehicles, without reducing its energy storage capacity or power output, increases the batteries' reliability, and decreases the cost.

DEFICIENCIES OF THE PRIOR ART

Thermal management of an electric vehicle battery system using a high energy battery technology has never before been demonstrated. Some technologies, such as Na—S, which operate at elevated temperatures are heavily insulated to maintain a specific operating temperature. This arrangement is undesirable due to a heavy penalty in overall energy density due to the excessive weight of the thermal management, high complexity and excessive cost. In other systems, such as Ni—Cd, attempts at thermal management have utilized a water cooling system. Again this type of thermal management system adds weight, complexity and cost to the battery pack.

Simply stated, the prior art does not teach an integrated battery configuration/internal design, battery module, and thermally managed battery pack system which is light weight, simple, inexpensive, and combines the structural support of the batteries, modules and packs with an air-cooled thermal management system.

SUMMARY OF THE INVENTION

One aspect of the instant invention provides for a mechanically improved rechargeable battery. The battery includes: 1) a battery case which includes a positive battery electrode terminal and a negative battery electrode terminal; 2) at least one positive battery electrode disposed within the battery case and electrically connected to the positive battery electrode terminal; 3) at least one negative battery electrode disposed within the battery case and electrically connected to the negative battery electrode terminal; 4) at least one battery electrode separator disposed between the positive and negative electrodes within the battery case to electrically insulate the positive electrode from the negative electrode, but still allow for chemical interaction thereof; and 5) battery electrolyte surrounding and wetting the positive electrode, the negative electrode, and the separator. The battery case is prismatic in shape and has an optimized thickness to width to height aspect ratio.

Another aspect of the present invention includes an improved, high-power battery module. The battery module of the instant invention includes: 1) a plurality of individual batteries; 2) a plurality of electrical interconnects connecting the individual batteries of the module to one another and providing means for electrically interconnecting separate battery modules to one another; and 3) a battery module bundling/compression means. The batteries are bound within the module bundling/compression means under external mechanical compression which is optimized to balance outward pressure due to expansion of the battery components and provide additional inward compression on the battery electrodes within each cell to reduce the distance between the positive and negative electrodes, thereby increasing overall cell power.

The module bundling/compression means is designed to: 1) allow for application of the required battery compression; 2) perform the required mechanical function of vibration resistant module bundler; and 3) be as light weight as possible.

Yet another aspect of the present invention is the mechanical design of light-weight, fluid-cooled, battery pack systems. In its most basic form the instant fluid-cooled battery pack system includes: 1) a battery-pack case having at least one coolant inlet and at least one coolant outlet; 2) at least one battery module disposed and positioned within the case such that the battery module is spaced from the case walls and from any other battery modules within the case to form coolant flow channels along at least one surface of the bundled batteries, the width of the coolant flow channels is optimally sized to allow for maximum heat transfer, through convective, conductive and radiative heat transfer mechanisms, from the batteries to the coolant; and 3) at least one coolant transport means which causes the coolant to enter the coolant inlet means of the case, to flow through the coolant flow channels and to exit through the coolant outlet means of the case. In a preferred embodiment, the battery pack system is air-cooled.

In still another aspect of the present invention, the above described mechanical design of the battery, module, and battery pack system is integrated electronically through a charger algorithm designed to charge the battery pack system quickly while extending the battery life through minimized overcharge and heat generation management.

Finally the batteries, modules and packs can also include means for providing variable thermal insulation to at least that portion of the rechargeable battery system which is most directly exposed to said ambient thermal condition, so as to maintain the temperature of the rechargeable battery system within the desired operating range thereof under variable ambient conditions.

BRIEF DESCRIPTION OF THE DRAWINGS

FIG. 13b is a stylized depiction of a cross-sectional view of the ribbed end plate of FIG. 13a;

DETAILED DESCRIPTION OF THE INVENTION

Figure 1:
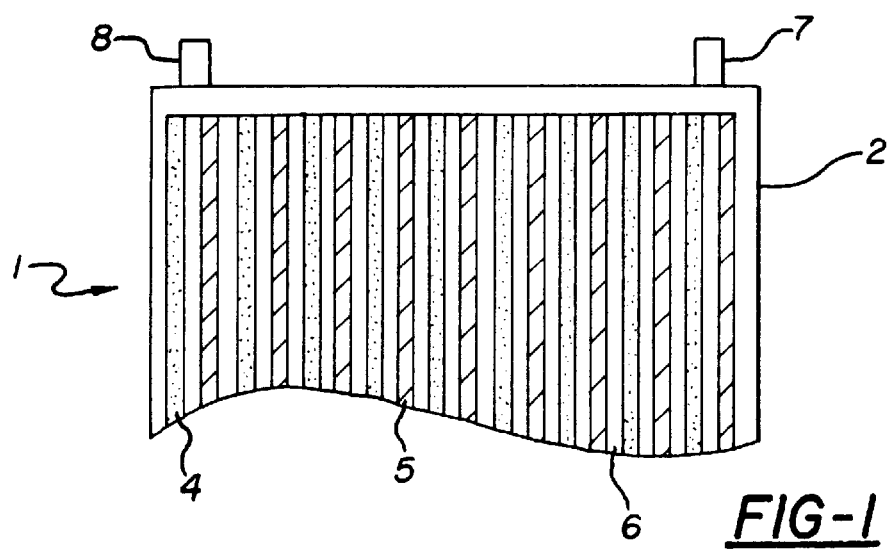
FIG. 1 is a highly stylized depiction of a cross-sectional view of the mechanically improved rechargeable battery of the invention, specifically illustrating the battery electrodes, separator, battery case, and the battery electrical terminals.

One aspect of the instant invention provides for a mechanically improved rechargeable battery, shown generically in FIG. 1. Typically in the field of rechargeable batteries, such-as the nickel-metal hydride battery system much emphasis is placed upon the electrochemical aspects of the batteries, while much less time and energy are spent in improving the mechanical aspects of battery, module and pack design.

The instant inventors have investigated improvements in the mechanical design of rechargeable battery systems, looking at aspects such as energy density (both volumetric and gravimetric), strength, durability, mechanical aspects of battery performance, and thermal management.

In response to these investigations, the instant inventors have designed a mechanically improved rechargeable battery 1 which includes: 1) a battery case 2 which includes a positive battery electrode terminal 7 and a negative battery electrode terminal 8; 2) at least one positive battery electrode 5 disposed within the battery case 2 and electrically connected to the positive battery electrode terminal 7; 3) at least one negative battery electrode 4 disposed within the battery case 2 and electrically connected to the negative battery electrode terminal 8; 4) at least one battery electrode separator 6 disposed between the positive and negative electrodes within the battery case 2 to electrically insulate the positive electrode from the negative electrode, but still allow for chemical interaction thereof; and 5) battery electrolyte (not shown) surrounding and wetting the positive electrode 5, the negative electrode 4, and the separator 6. The battery case 2 is prismatic in shape and has an optimized thickness to width to height aspect ratio.

As used herein, the term "battery" specifically refers to electrochemical cells which include a plurality of positive and negative electrodes separated by separators, sealed in a case having positive and negative terminal on its exterior, where the appropriate electrodes are all connected to their respective terminals.

This optimized aspect ratio, as described below, allows the battery to have balanced optimal properties when compared with prismatic batteries which do not have this optimized aspect ratio. Specifically the thickness, width and height are all optimized to allow for maximum capacity and power output, while eliminating deleterious side effects. Additionally, this particular case design allows for unidirectional expansion which can readily be compensated for by applying external mechanical compression in that one direction. The instant inventors have found that the optimal electrode thickness to width ratio to be between about 0.1 to 0.75 and the optimal height to width ratio to be between 0.75 and 2.1. Specific examples of batteries and their electrode height to width ratio is given in Table 1.

TABLE 1

| Battery Type | Height(mm) | Width(mm) | Ratio(H/W) |
|---|---|---|---|
| L | 140 | 75 | 1.87 |
| M | 187 | 91 | 2.06 |
| M-20 | 167 | 91 | 1.84 |
| M-40 | 147 | 91 | 1.62 |
| M-60 | 127 | 91 | 1.40 |

Figure 23:
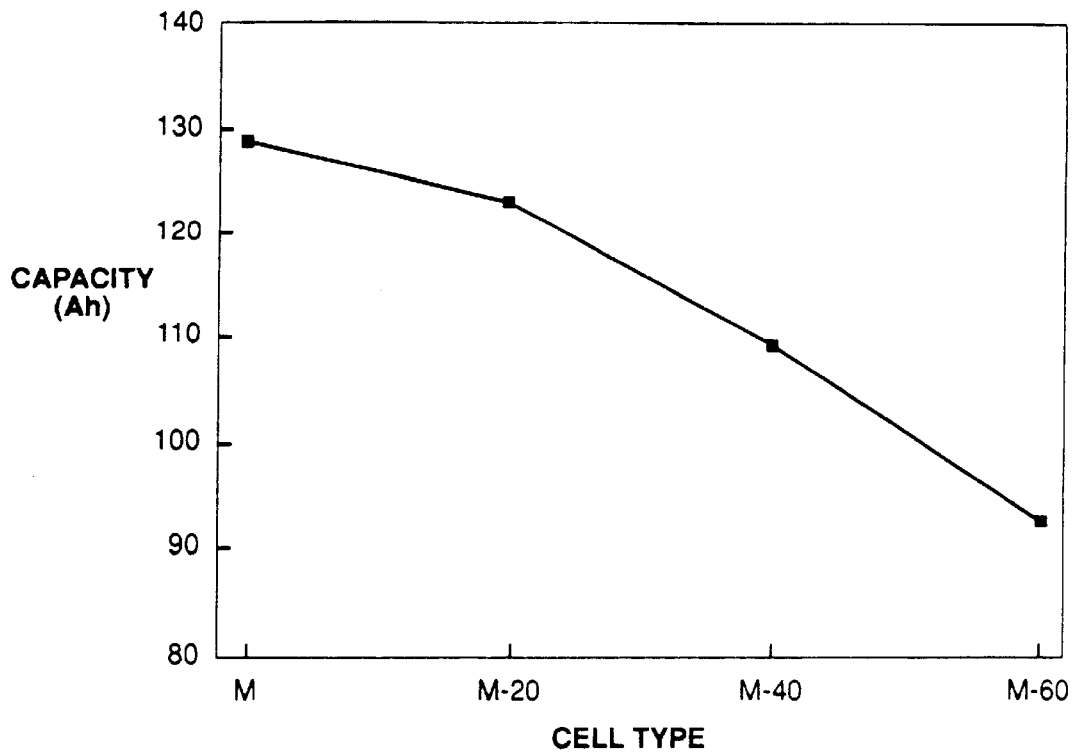
FIG. 23 is a plot of battery capacity measured in Ah verses battery type for the M series batteries.
Figure 24:
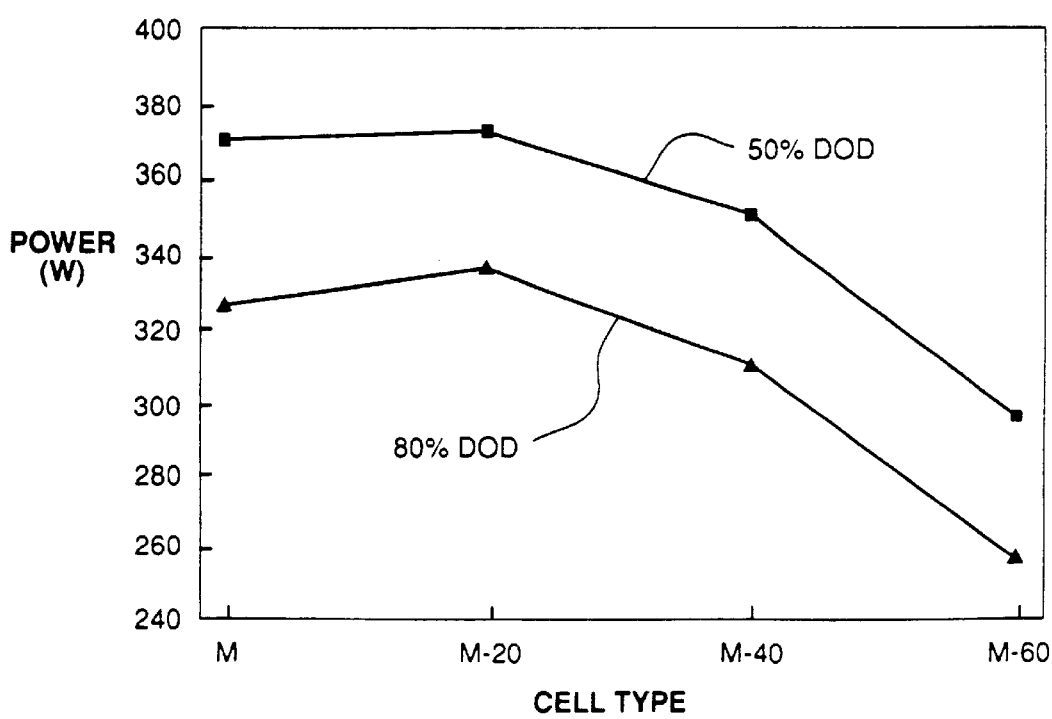
FIG. 24 is a plot of battery power measured in W verses battery type for the M series batteries.
Figure 25:
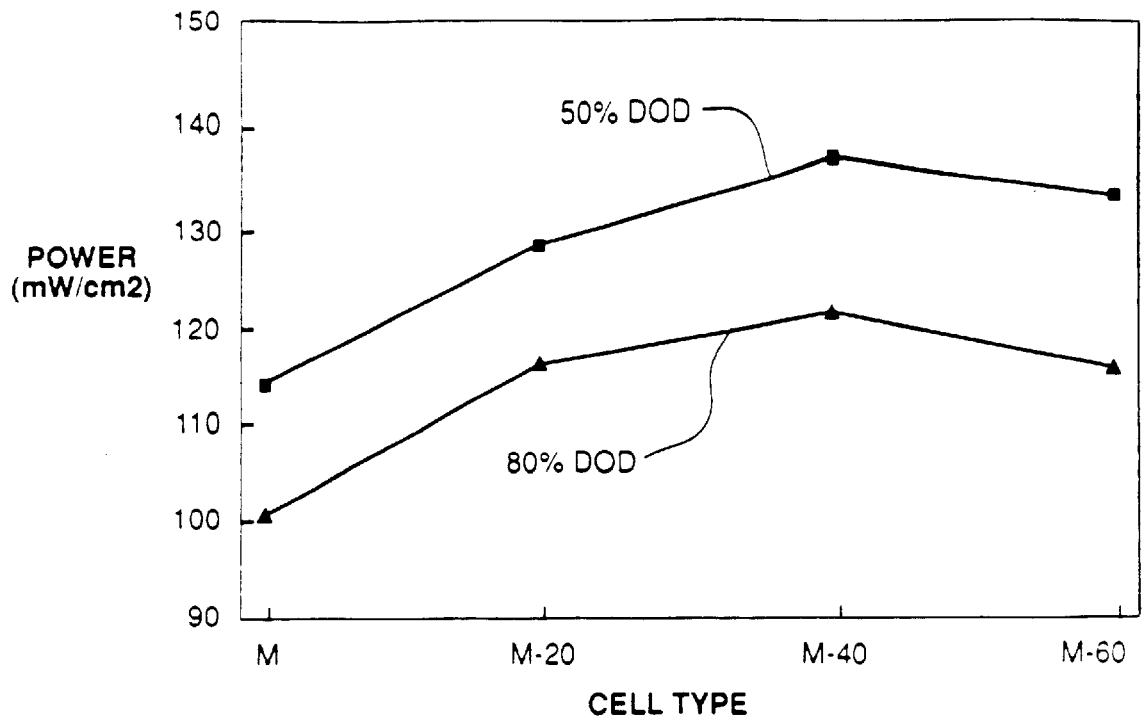
FIG. 25 is a plot of normalized battery power measured in mW/cm$^2$ verses battery type for the M series batteries.
Figure 26:
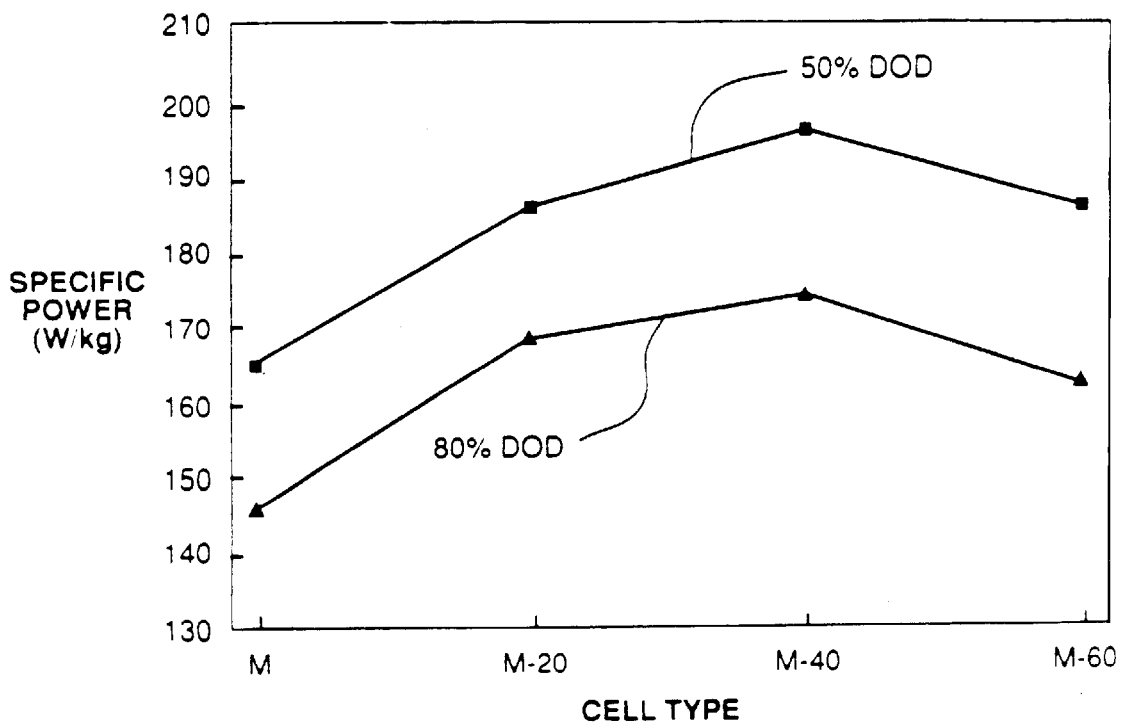
FIG. 26 is a plot of specific battery power measured in W/Kg verses battery type for the M series batteries.

It should be noted that even within the optimal range of ratios, there are suboptimal ranges depending upon the desired properties of the batteries. For example, FIGS. 23–26 show how the different height to width aspect ratios of the M series of batteries (shown in Table 1) give different optimums depending upon the specific properties desired. FIGS. 23 and 24, which are plots of capacity in Ah and power in W verses battery type, respectively, indicate that for maximum capacity and power, the M cell is best. However, as can be seen from FIG. 25, which is a plot of normalized power in mW/cm$^2$ verses battery type, if the power is normalized to the area of the electrodes, the M-40 cell is the best. Another plot (not shown) of normalized capacity in mAh/cm$^2$ verses battery type also indicates that the M-40 cell is best. Additionally, if the specific power of the batteries are determined, the M-40 cell is also the best, as shown by FIG. 26 which plots the specific power of the batteries in W/Kg verses battery type. Finally, if the specific energy of the batteries is important, the M-20 cell is the best, as shown by a plot (not shown) of the specific energy of the batteries in Wh/Kg verses battery type.

In determination of the optimal ratios, the instant inventors have noted that if the batteries are too high (tall) there is an increased tendency for the electrodes to crack upon expansion and contraction. There is also problems with increased internal electrical resistance of the electrodes, and gravimetric segregation of the electrolyte to the bottom of the battery leaving the upper portions of the electrodes dry. Both of these later problems reduce the capacity and power output of the batteries. If, on the other hand, the electrodes are too short, the capacity and power of the battery are reduced due to lowered inclusions of the electrochemically active materials and the specific energy density of the battery is reduced due to the change in the ratios of dead weight battery components to electrochemically active components.

Also, if the batteries are too wide, there is an increased tendency for the electrodes to crack upon expansion and contraction. There is also a problem with increased internal electrical resistance which reduces the capacity and power output of the batteries. But, if the electrodes are too narrow, the capacity and power of the battery are reduced due to lowered inclusion of the electrochemically active materials and the specific energy density of the battery is reduced due to the change in the ratios of dead weight battery components to electrochemically active components.

Finally, if the battery is too thick there are problems with improper thermal dissipation from the central electrodes which reduces battery capacity and power. Also, there is an increased overall electrode bundle expansion in the thickness direction which causes warpage and damage to the battery case and creates gaps between the positive and negative electrodes thereby reducing battery power and capacity. This excessive electrode bundle expansion must be compensated for by external mechanical compression. However, when the battery is too thick, an excessive amount of external force is required to compensate for the expansion and cracking of the electrodes occurs. On the other hand, if the battery is too thin, fewer electrodes will fit in the battery and therefore the capacity and power of the battery are reduced due to lowered inclusion of the electrochemically active materials and the specific energy density of the battery is reduced due to the change in the ratios of dead weight battery components to electrochemically active components.

Within this application the term "expansion" includes both thermal and electrochemical expansion. The thermal expansion is due to heating of the battery components by the mechanisms described above and the electrochemical expansion is due to a changing between different lattice structures in the charged and discharged states of the electrochemically active materials of the battery.

The battery case 2 is preferably formed from any material which is thermally conductive, mechanically strong and rigid, and is chemically inert to the battery chemistry, such as a metal. Alternatively, a polymer or composite material may be used as the material for the battery case. In choosing a such a material, consideration must be given to thermal heat transfer. As detailed in U.S. patent application Ser. No. 08/238,570, filed May 5, 1995, now U.S. Pat. No. 5,559,950, the contents of which are incorporated by reference, experiments with plastic cases show that the internal temperature of a plastic cased metal-hydride battery rises to about 80° C. from ambient after cycling at C/10 to 120% of capacity, while a stainless steel case rises to only 32° C. Thus, thermally conductive polymer or composite material cases are preferred. Most preferably the case is formed from stainless steel. It is advantageous to electrically insulate the exterior of the metal case from the environment by coating it with a non-conductive polymer coating (not shown). An example of one such layer is insulating polymer tape layer made from a polymer such as polyester. The mechanical strength and ruggedness of the polymer tape is important as well as its insulating properties. Additionally, it is preferably inexpensive, uniform, and thin.

The interior of the battery case 2 must also be electrically insulated from the battery electrodes. This can be accomplished by coating an electrically insulating polymer (not shown) onto the interior of the battery case, or alternatively, enclosing the battery electrodes and electrolyte in an electrically insulating polymer bag (not shown), which is inert to the battery chemistry. This bag is then sealed and inserted into the battery case 2.

Figure 3:
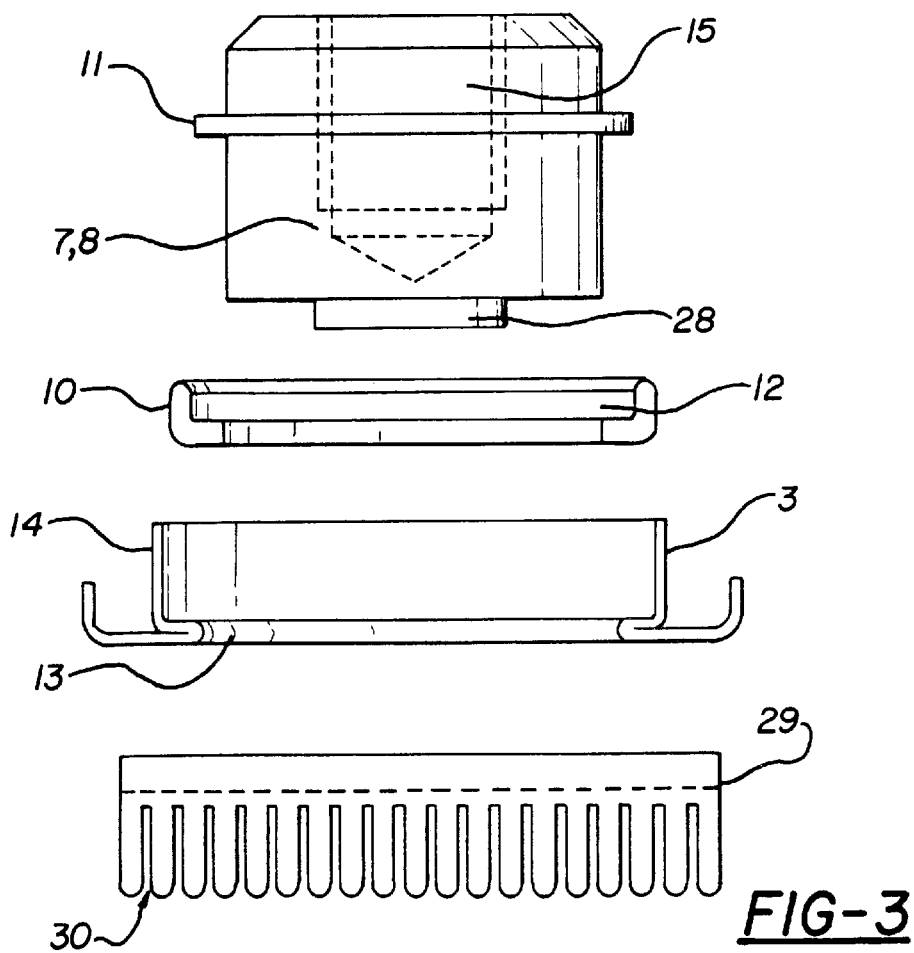
FIG. 3 is a blow-up of the terminal, can top, terminal seal and electrode comb depicted in FIG. 2.
Figure 2:
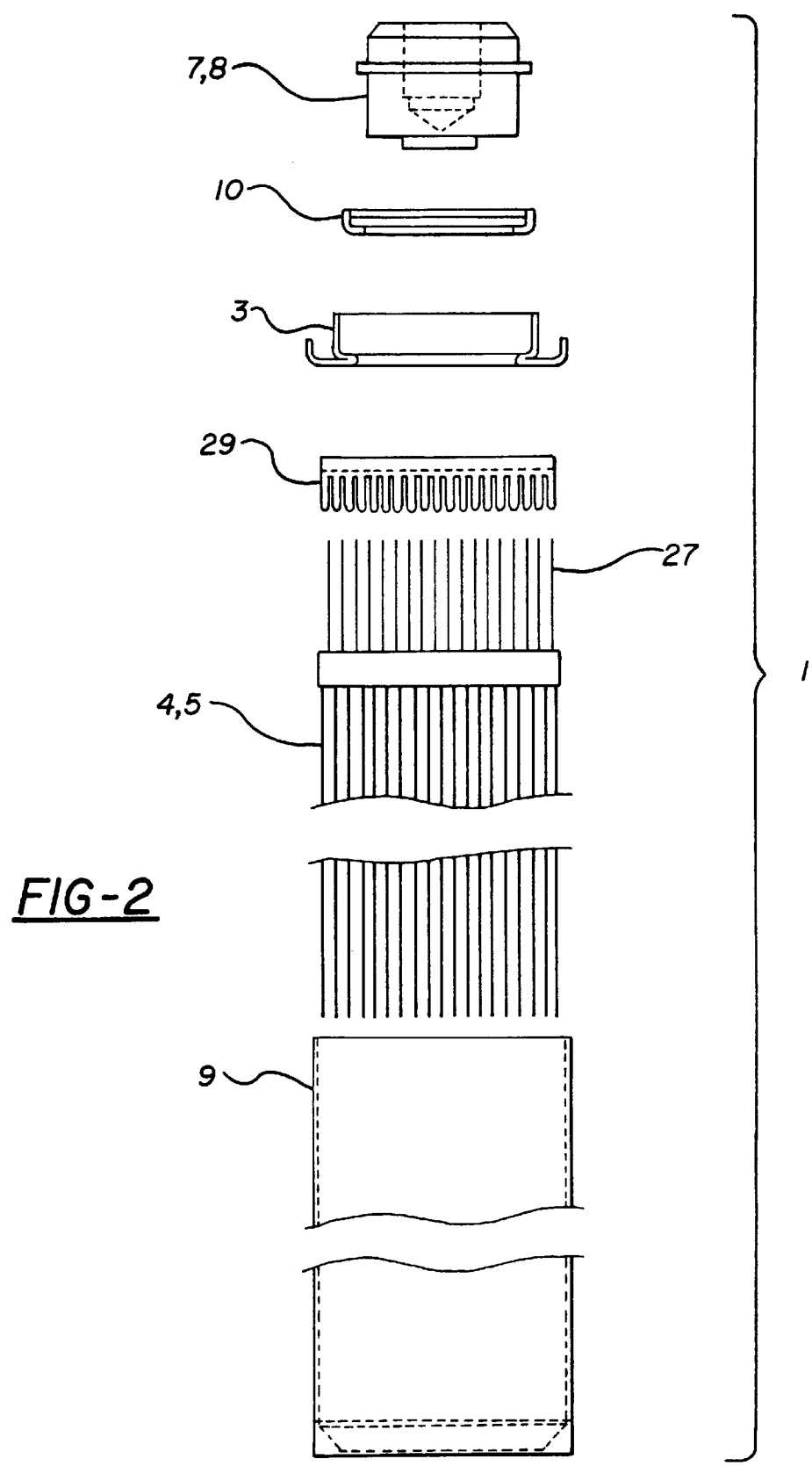
FIG. 2 is a stylized depiction of an exploded, cross-sectional view of the mechanically improved rechargeable battery, specifically illustrating how many of the battery components interact when assembled.

In a preferred embodiment, shown in FIG. 2, the battery case includes a case top 3 onto which the positive battery electrode terminal 7 and the negative battery electrode terminal 8 are affixed, and a battery case can 9 into which the electrodes 4, 5 are disposed. FIG. 3 shows that the case top 3 includes openings 13, through which the positive and negative battery terminals 7, 8 are in electrical communication with the battery electrodes 4, 5. The diameter of the openings 13 is slightly larger than the outer diameter of the terminal 7, 8, but smaller than the outer diameter of a seal 10 used to seal the terminal 7, 8 to the case top 3. The terminals 7, 8 include a sealing lip 11 which assists in sealing the terminal 7, 8 to the case top 3, using the seal 10. The seal 10 is typically a sealing ring. The seal 10 includes a sealing lip slot 12 into which the sealing lip 11 of the terminal 7, 8 is fit. This slot 12 helps to form a good pressure seal between the terminal 7, 8 and the case top 3 and to keep the seal 10 in place when the terminal 7, 8 is crimped into the case top 3. The seal 10 is preferably formed of an elastomeric, dielectric, hydrogen impermeable material, such as, for example, polysulfone. The case top 3 also includes a shroud 14 surrounding the each of the openings 13 and extending outward from the case top 3. The shroud 14 has an inner diameter slightly larger than the outer diameter of the seal 10. The shroud 14 is crimped around the seal 10 and the sealing lip 11 of the battery terminal 7, 8, to form an electrically non-conductive pressure seal between the terminal 7, 8 and the case top 3. The crimp terminal seal provides vibration resistance when compared to the threaded seal of the prior art. The case top 3, case can 9, and annular shroud 14 may be formed from 304L stainless steel.

Figure 4:
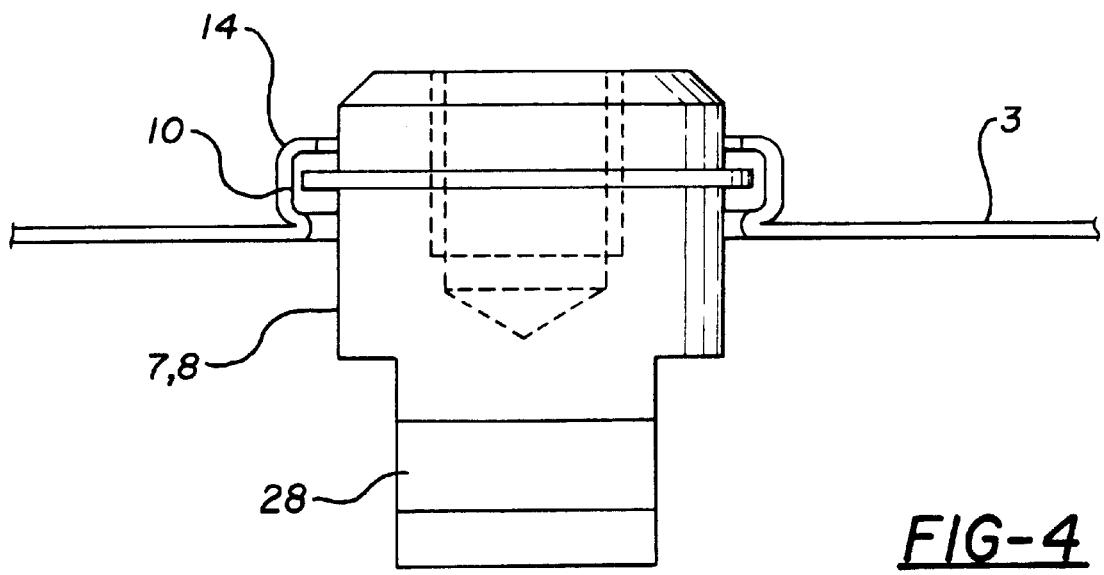
FIG. 4 is a stylized depiction of a cross-sectional view of the crimp seal formed to seal the battery terminal to the battery can top.

FIG. 4, shows a portion of the battery of the present invention specifically depicting the fashion in which the battery terminal 7, 8 is crimp sealed into the case top 3. From this figure, it can be clearly determined how the shroud 14 of the case top 3 is crimp sealed around the seal 10 which is, in turn, sealed around the sealing lip 11 of the battery terminal 7, 8. In this manner the vibration resistant pressure seal is formed.

The method of attaching the terminal 7, 8 to the case top 3 involves crimp sealing the terminal 7, 8 to the case top 3. This crimp sealing method has a number of advantages over the prior art. Crimp sealing can be done rapidly on high speed equipment leading to a direct cost reduction. In addition, this method uses less material than the prior art which reduces the weight of the terminals resulting in an indirect cost reduction. The higher surface area of this design coupled with the decreased weight of the materials also results in increased heat dissipation from the terminals. Yet another advantage of the present invention is that it permits forming the battery case and other parts from any malleable material and specifically does not require laser sealing, special ceramic to metal seals, or special (and thereby expensive) methods of any kind. In addition, the overall number of parts and the need for highly machined precisely fabricated parts are eliminated.

The battery terminals 7, 8 are typically formed from a copper or copper alloy material, preferably nickel plated for corrosion resistance. However, any electrically conductive material which is compatible with the battery chemistry may be used. It should be noted that the battery terminals 7, 8 described in context with the present invention are smaller in annular thickness and of a greater diameter than those of the prior art. As a result, the terminals of the present invention are very efficient dissipaters of heat, and thus contribute significantly to the thermal management of the battery.

The terminals 7, 8 may also include an axially aligned central opening 15. The central opening 15 serves many purposes. One important consideration is that it serves to reduce the weight of the battery. It can also serve as an opening into which an external electrical connector may be friction fit. That is a cylindrical or annular battery lead connector may be friction fitted into the central opening 15 to provide an external electrical connection to the battery. Finally, it can serve as the location for a pressure release vent for venting excessive pressure from the interior of the battery. The opening 15 can extend partially through the terminal (if it is intended to serve only as a connector socket) or all the way through (if it is intended to contain a pressure vent and serve as a connector socket).

Figure 5:
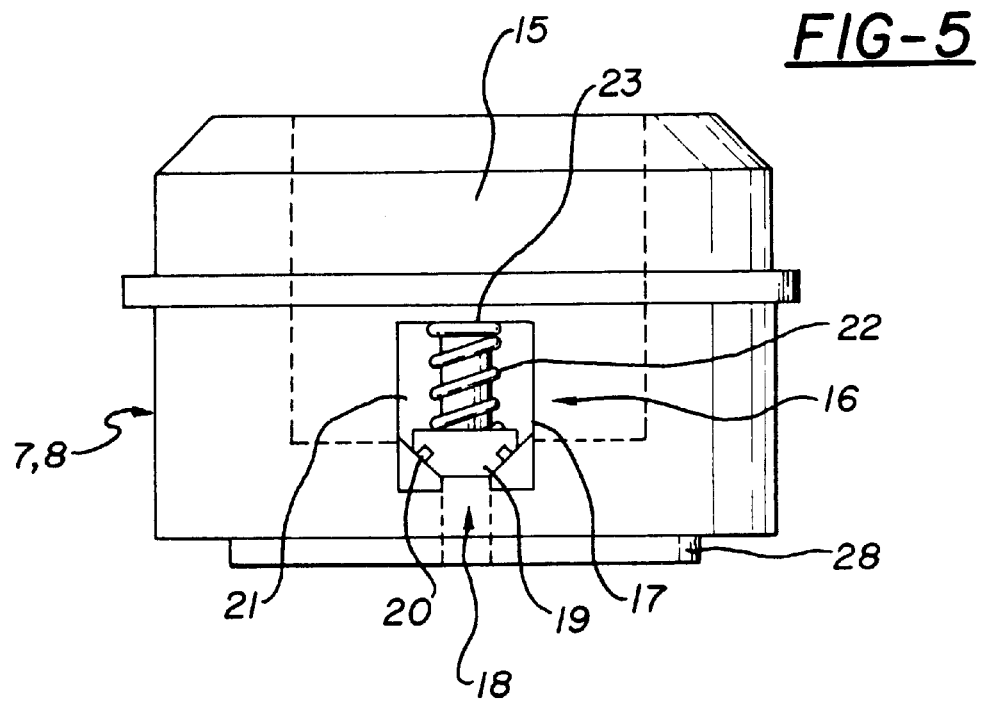
FIG. 5 is a stylized depiction of a cross-sectional view of one embodiment of the battery terminal, specifically illustrating how a pressure vent can be incorporated into the terminal.

When at least one of the terminals 7, 8 includes a pressure vent for releasing internal pressure of the battery to the surrounding atmosphere, the vent can be affixed in the axial opening within the terminal, see FIG. 5. Most preferably the pressure vent 16 includes: 1) a vent housing 17 having a hollow interior area 21 in gaseous communication with the surrounding atmosphere and the interior of the battery case via the openings 15, 18 and 23; 2) a pressure release piston 19 is positioned within the hollow interior area 21, the pressure release piston 19 is sized to seal the axial opening 16 and has a seal groove 20 on its surface opposite the axial opening 16; 3) an elastomeric, dielectric seal (not shown) is mounted within the seal groove, the seal groove 20 is configured to encapsulate all but one surface of the seal, thereby leaving the non-encapsulated surface of the seal exposed; and 4) a compression spring 22 is positioned to urge the pressure release piston 19 to compress the seal in the seal groove 20 and block the axial opening 18 in the terminal 7, 8. Refer to commonly owned U.S. Pat. No. 5,258,242, issued filed Nov. 2, 1993, entitled "ELECTRO-CHEMICAL CELL HAVING IMPROVED PRESSURE VENT", the disclosure of which is hereby incorporated by reference. Again, preferably the elastomeric, dielectric seal is formed of a hydrogen impermeable polysulfone material. Additionally it is preferable that the vent be designed to release internal pressure in excess of about 120 pounds per square inch to insure battery integrity, since the battery cans are generally rated for at most about 150 pounds per square inch.

In addition to the resealable vent described above, other types of vents may be used in the batteries of the instant invention. Specifically, rupture disks, pressure plugs and septum vents may be used. One such septum vent is described in U.S. Pat. No. 5,171,647, the contents of which are hereby incorporated by reference. Also, while it is preferred that the pressure vent be located within a hollow battery terminal, the vent can just as effectively be located elsewhere on the battery top in its own protective housing or merely attached to an opening in the top of the battery case.

Figure 6:
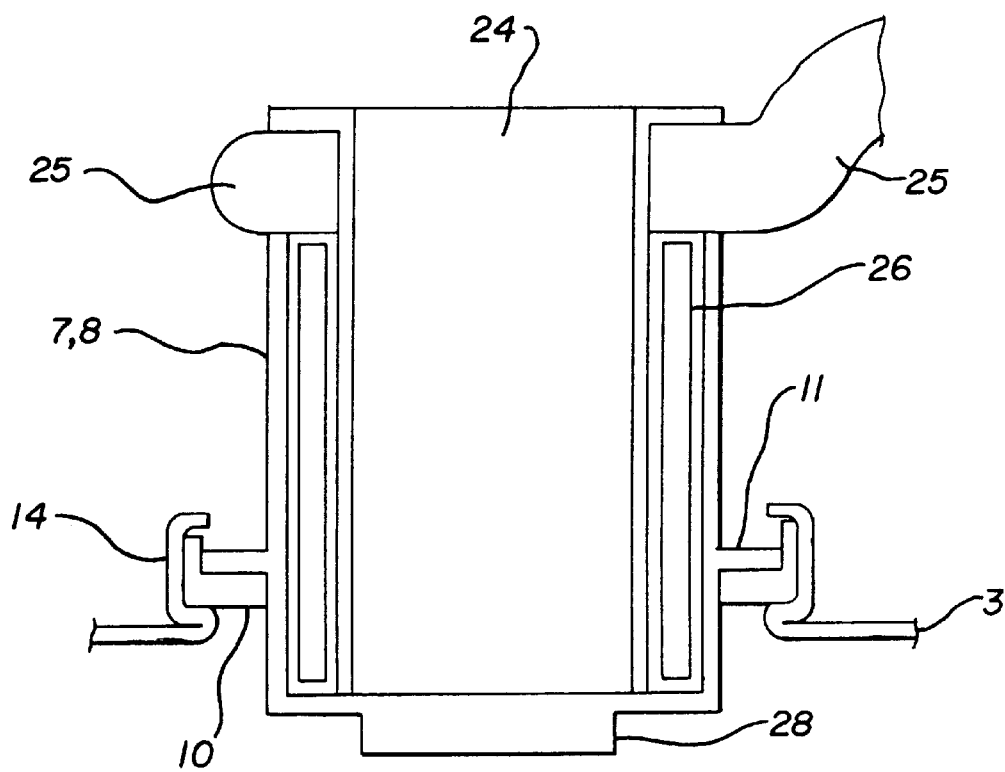
FIG. 6 is a stylized depiction of a cross-sectional view of another embodiment of the battery terminal, specifically illustrating how a socket type electrical lead connector can be incorporated into the terminal.

Another alternative embodiment of the battery terminal is presented in FIG. 6, which shows a terminal 7, 8 into which an external battery lead connector 24 can be friction fit. The connector 24 is attached to an external battery lead 25. Lead 25 may be any of the type typically known in the art such as a solid bar; a metal ribbon; a single or multi strand wire; or a braided, high current, battery cable (as is described hereinbelow). Preferably the lead connector 24 is a hollow annular barrel connector which is friction fit into the axially aligned central opening 15 of the battery terminal 7, 8. The lead connector 24 is held in the battery terminal 7, 8 via a barrel connector web 26. A solid barrel connector is described in U.S. Pat. No. 4,657,335, dated Apr. 14, 1987 and U.S. Pat. No. 4,734,063, dated Mar. 29, 1988, each to Koch et al. and entitled "RADIALLY RESILIENT ELECTRICAL SOCKET," the disclosures of which are hereby incorporated by reference.

If desired, the embodiments presented in FIGS. 5 and 6 may be combined into a single embodiment which incorporates both the pressure vent 16 and the external battery lead connector 24. In addition, a rupture disk (i.e. a non-resealable means of releasing excess pressure) can be included instead of or in addition to the pressure vent.

While the crimp seal terminals and case top are the preferred embodiment of the instant invention, other types of terminals and, therefore, other types of case tops may be used. Specifically, a screw on terminal incorporating an o-ring type of seal may be employed. Generally, any type of known sealed terminal may be used as long as it can contain the operating pressures of the battery and is resistant to the electrochemical environment of the battery.

While any battery system may benefit from the present improvements in battery, module, and pack configuration, it is preferred that the positive electrodes are formed from a nickel hydroxide material and the negative electrodes are formed from a hydrogen absorbing alloy. Preferably, the negative electrode material is an Ovonic metal-hydride alloy. (That is, a disordered, multicomponent metal hydride alloy as described in U.S. patent appplication Ser. No. 08/259,793 filed Jun. 14,1994, now U.S. Pat. No. 5,506,069 and also U.S. Pat. No. 5,407,781, issued Apr. 18, 1995 [both specifically incorporated by reference], and the applications and references that depend from them and are specifically referenced in them.) Also it is preferable that the electrodes are separated by non-woven, felted, nylon or polypropylene separators and the electrolyte is an alkaline electrolyte, for example, containing 20 to 45 weight percent potassium hydroxide. Such separators are described in U.S. Pat. No. 5,330,861, the contents of which are incorporated by reference.

Ni—MH batteries for consumer applications on the market used pasted metal hydride electrodes in order to achieve sufficient gas recombination rates and to protect the base alloy from oxidation and corrosion. Such pasted electrodes typically involved mixing the active material powder with plastic binders and other nonconductive hydrophobic materials. An unintended consequence of this process is a significant reduction in the thermal conductivity of the electrode structure as compared to a structure of the present invention which consists essentially of a 100% conductive active material pressed onto a conductive substrate.

In a sealed prismatic Ni—MH battery according to the present invention, the buildup of heat generated during overcharge is avoided by using a cell bundle of thermally conductive metal hydride electrode material. This thermally conductive metal hydride electrode material contains metal hydride particles in intimate contact with each other. Oxygen gas generated during overcharge recombines to form water and heat at the surface of these particles. In the present invention, this heat follows the thermally conductive negative electrode material to the current collector and then to the surface of the case. The thermal efficiency of the bundle of thermally conductive metal hydride electrode material is further improved if this electrode bundle is in thermal contact with a battery case that is also thermally conductive.

In the present invention, the metal hydride negative electrode material is preferably a sintered electrode such as described in U.S. Pat. Nos. 4,765,598; 4,820,481; 4,915,898, 5,507,761; and U.S. patent application Ser. No. 08/259,793, now U.S. Pat. No. 5,506,069 (the contents of which are incorporated by reference) fabricated using sintering so that the Ni—MH particles are in intimate thermal contact with each other.

One aspect of the present invention recognizes that in sealed Ni—MH batteries, heat generation is particularly high during overcharge, especially under commercially desirable fast charge applications. It is noteworthy that the heat generated during overcharge is due to oxygen recombination on the surface of the metal hydride electrode. Consequently, it is possible to utilize a thermally conductive metal hydride electrode in conjunction with a pasted positive electrode. This preferred embodiment is especially useful for optimizing specific energy, overall performance, and cost of the battery. For a more detailed description of the use of sintered electrodes see U.S. patent application Ser. No. 08/238,570, entitled "OPTIMIZED CELL PACK FOR LARGE SEALED NICKEL-METAL HYDRIDE BATTERIES", filed May 5, 1994, now U.S. Pat. No. 5,558,950, the contents of which are hereby incorporated by reference.

Figure 7:
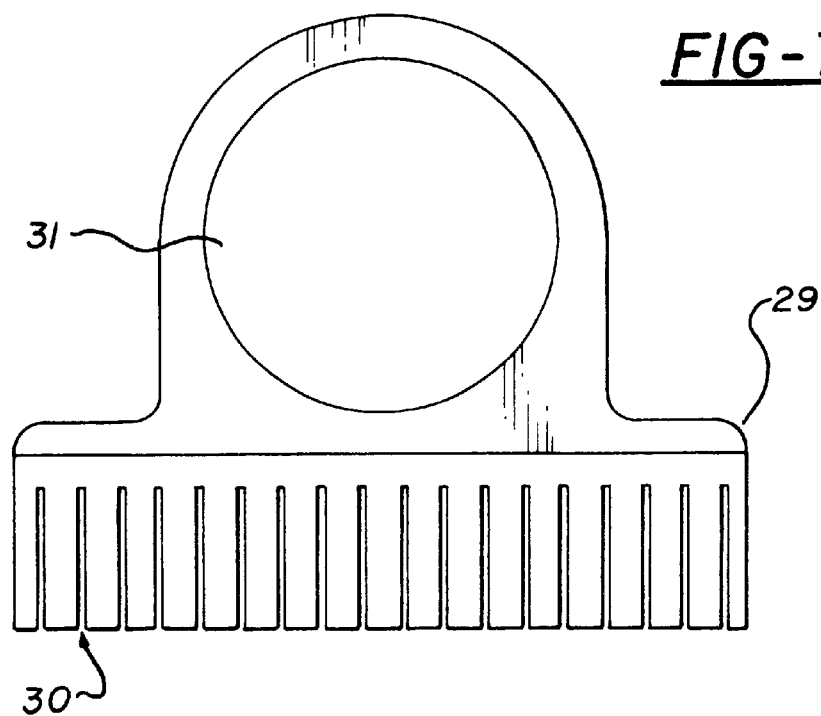
FIG. 7 is a stylized depiction of an electrode comb.
Figure 8:
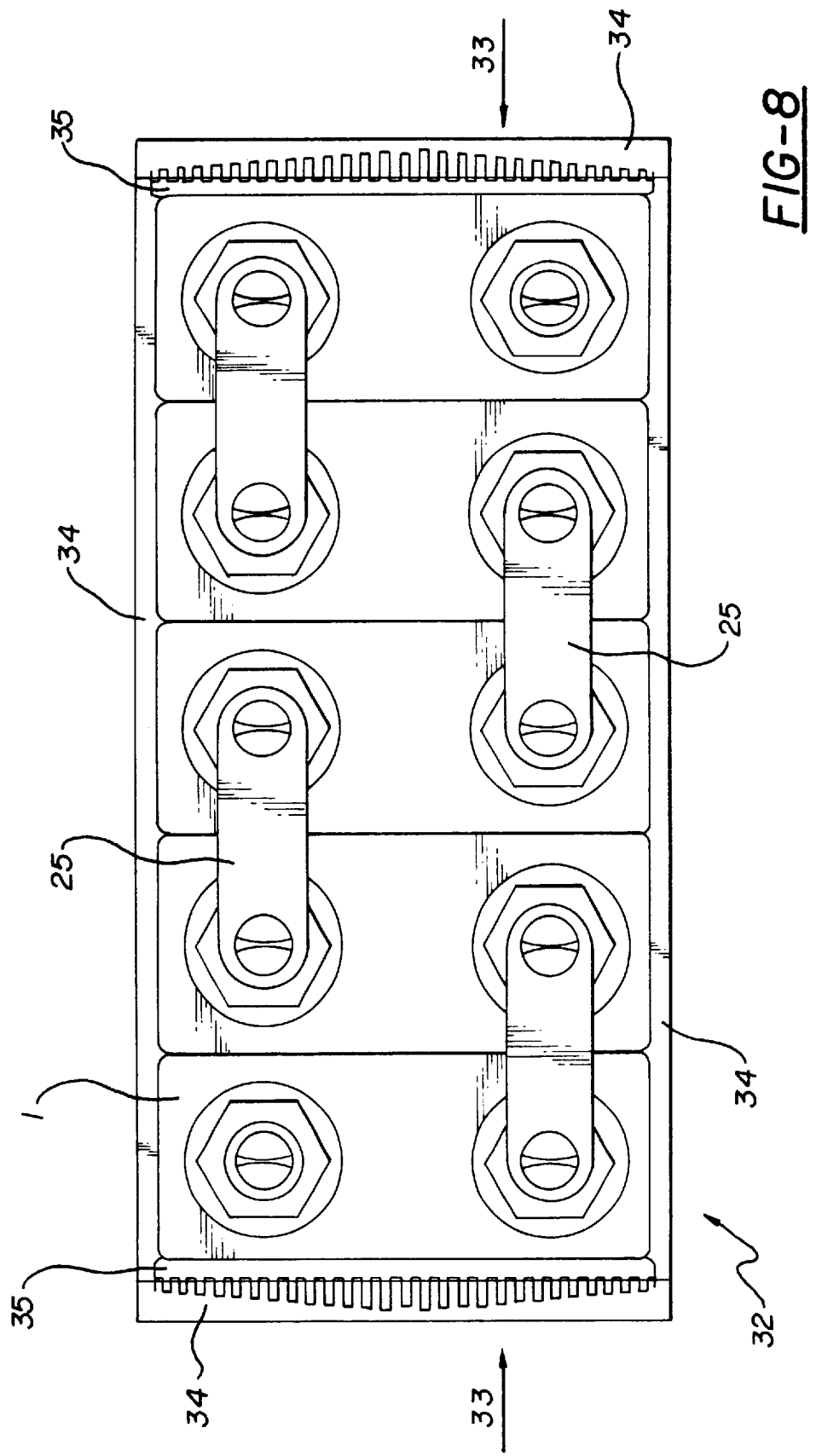
FIG. 8 is a stylized depiction of a top view of a battery module of the instant invention, specifically illustrated is the manner in which the batteries are bundled, including their orientation, the bars and end-plates which hold the batteries under external mechanical compression, and the axis of compression.
Figure 9:
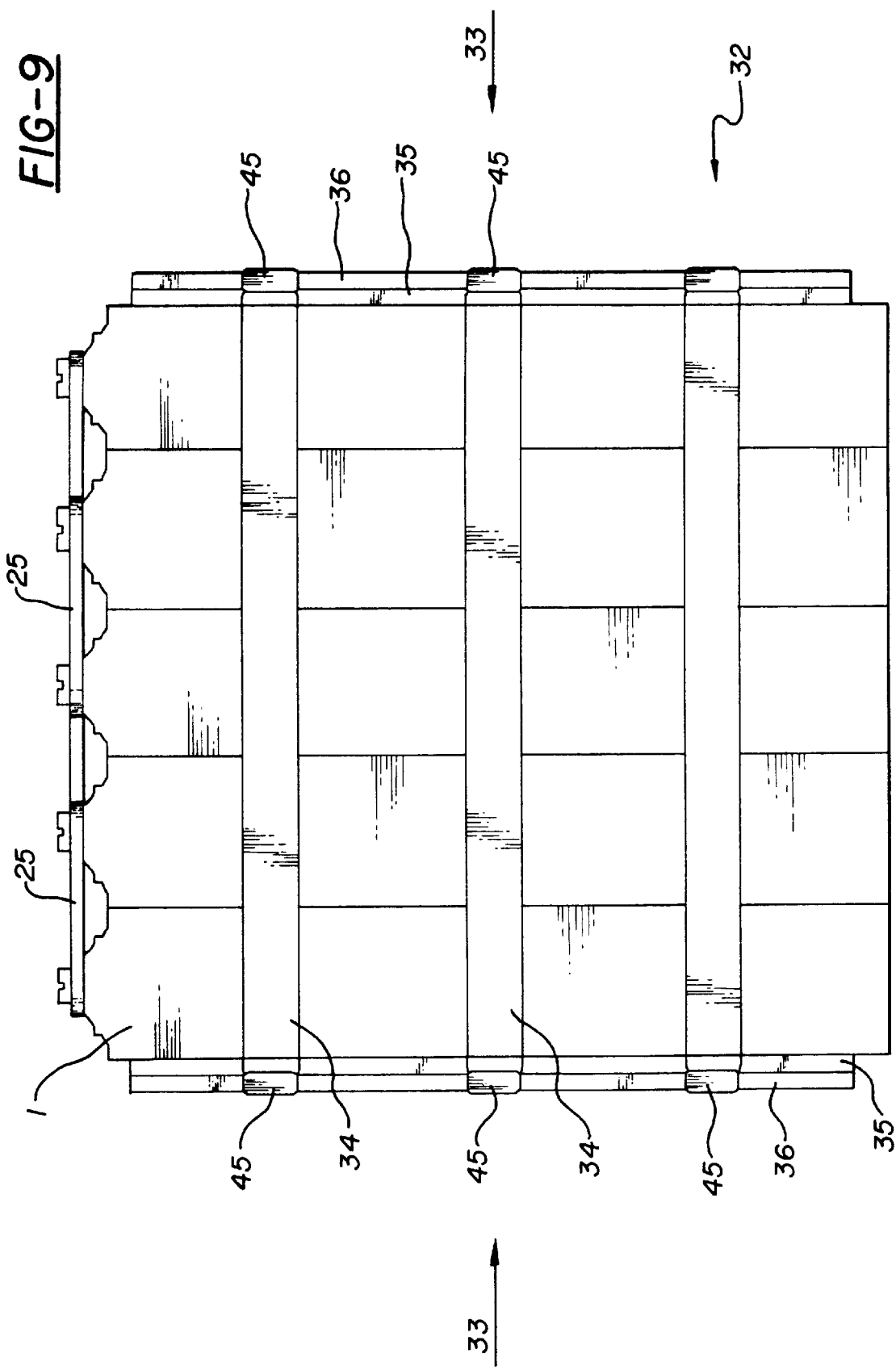
FIG. 9 is a stylized depiction of a side view of the battery module of FIG. 8, specifically illustrated is the manner in which the metal bars are set into slots in the ribs of the end-plates.
Figure 10:
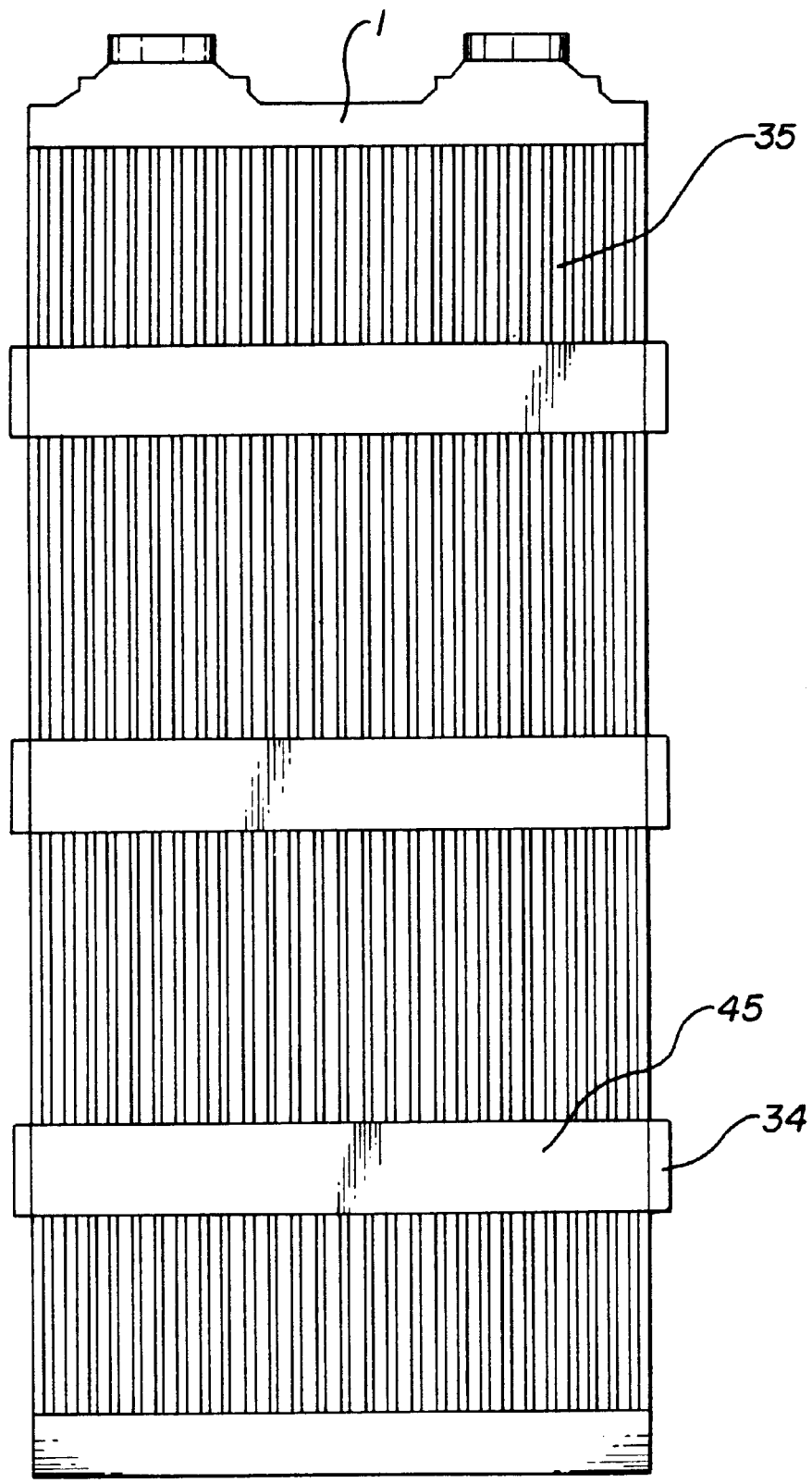
FIG. 10 is a stylized depiction of an end view of the battery module of FIGS. 8 and 9, specifically shown is the manner in which the end plates and the compression bars interact.
Figure 11:
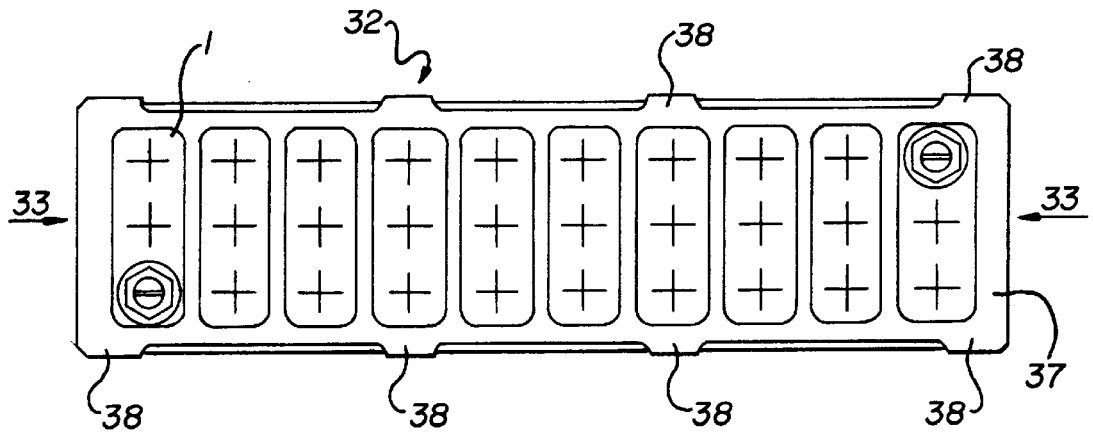
FIG. 11 is a stylized depiction of a top view of a battery module of the instant invention, specifically illustrating the module spacers of the instant invention and the spacer tabs attached thereto.
Figure 12:
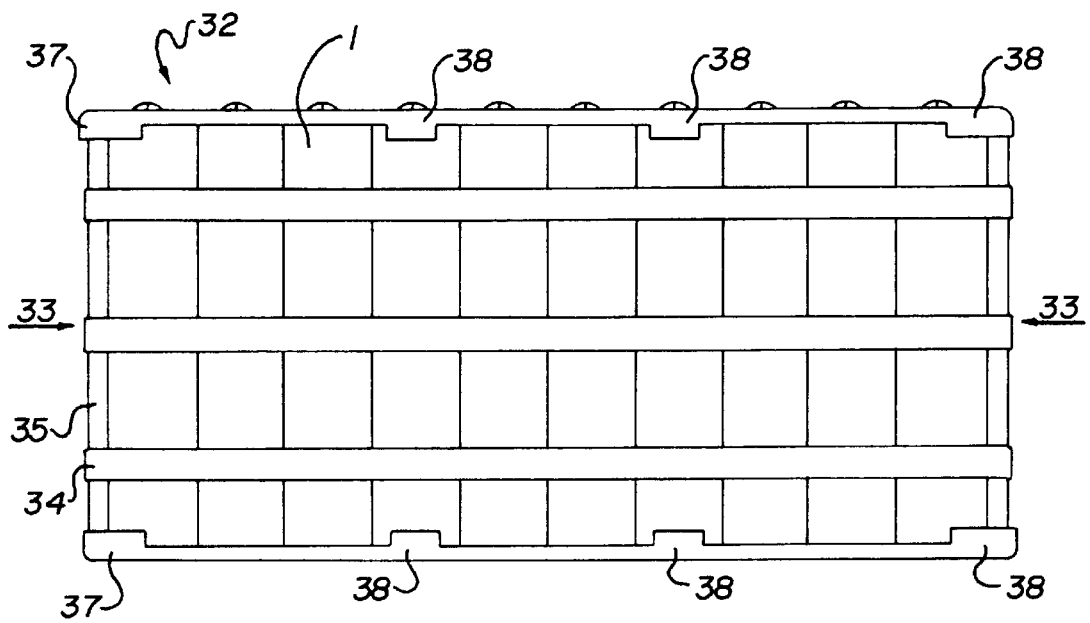
FIG. 12 is a stylized depiction of a side view of the battery module of FIG. 11, specifically illustrating the manner in which the module spacers are placed on the top and bottom of the battery module.

As is shown in FIG. 2, each of the electrodes 4, 5 which form an electrode stack have electrical connector tabs 27 attached to them. These tabs 27 are used to transport the current created in the battery to the battery terminals 7, 8. The tabs 27 are electrically connected to the terminals 7, 8 which may include a protrusion 28 for just such an attachment. Alternatively this protrusion 28 can be used to electrically and physically connect the terminal 7, 8 to the an electrode tab collector comb 29. As shown in FIG. 7 the comb 29 is typically an electrically conductive bar which includes a plurality of parallel electrode tab collecting slots 30 which hold the electrode tabs 27 by friction, welding, or brazing. FIG. 7 also shows the battery terminal connector opening 31 in the tab collecting comb 29. The battery terminal welding/brazing lip 28 is press fit into the opening 31, and may thereafter be brazed or welded into place if needed or desired.

The comb 29 provides a vibration resistant connector for transferring electrical energy from the electrodes 4, 5 to the terminals 7, 8. The comb 29 provides greater vibration resistance compared to the prior art method of bolting the collected tabs 27 to the bottom protrusion 28 of the terminal 7, 8. The prior art method of connecting the tabs 27 to the terminal 7, 8 also requires longer tabs and a longer case (a case having a greater head space). This adds to the total weight and volume of the batteries. The absence of bolts significantly reduces the head space of the battery resulting in an increase in the volumetric energy density. The comb 29 and battery terminals 7, 8 are preferably formed from copper or a copper alloy, which is more preferably nickel coated for corrosion resistance. However, they may be formed from any electrically conductive material which is compatible with the chemistry of the battery. While the electrode tab collector comb is the preferred means of attaching the electrode tabs to the battery terminals, other prior art means such as bolts, screws, welding or brazing may be used as well, and therefore the instant inventions is not seen to be limited to the preferred embodiment.

The positive and negative battery electrodes 4, 5 can be disposed in the battery case 2, such that their respective electrical collection tabs 27 are disposed opposite one another at the top of the case. That is, all of the negative electrode electrical collection tabs are positioned on one side of the battery and all of the positive electrode electrical collection tabs are positioned on the opposite side of the battery. Preferably the positive and negative battery electrodes have notched corners (not shown) where the opposite polarity electrode electrical collection tabs are located, thereby avoiding shorts between the electrodes and eliminating unused, dead-weight electrode material. Shorts can occur when the electrical collection tabs of one electrode become twisted or have sharp protrusions which then can pierce the electrode separator and short to the adjacent, opposite polarity electrode. The dead weight electrode material is caused by incorporation of active material into electrodes which are inactive because they are not adjacent to their counter electrode materials.

Although the batteries can have any number of electrodes, depending upon their thickness, preferably the battery includes 19 positive electrodes and 20 negative electrodes alternatingly disposed within said case. That is, the electrodes are alternated with negatives on the outside with alternating positive and negatives throughout the electrode stack. This configuration avoids possible shorts when the batteries are under external mechanical compression. That is, if there were a positive and a negative electrode at the outside of the electrode stack, there would be a possibility that the electrodes would form an electrical short path through the metal battery case when the battery is exposed to external mechanical compression.

While it is only necessary to have electrode separators 6 surrounding one set of the battery electrodes (i.e. separators around only the negative or only the positive electrodes) it may be advantageous to include separators 6 surrounding each set of electrodes. Data indicates that the use of double separators can reduce the self discharge level of the batteries. Specifically, charge retention increased from about 80% after two days for batteries with a single separator to about 93% after two days for batteries having double separators. The separators 6 are typical polypropylene separator materials well known in the prior art. They have an oriented grain or groove structure thought to be caused by the machine formation thereof and it is preferred that the grains or grooves of the polypropylene separator material are aligned lengthwise along the electrodes. This orientation lowers friction and prevents catching and sticking of the grains or grooves of one separator with those of an adjacent separator during mechanical compression and/or expansion of the electrodes because the sticking and catching can cause cracking of the electrodes.

Another aspect of the present invention includes an improved, high-power battery module (a "battery module" or "module" as used herein is defined as two or more electrically interconnected cells), specifically shown in FIGS. 8–12. To be useful, the batteries in a module must be densely packed, portable, and mechanically stable in use. Additionally, the materials used in construction of the battery modules (aside from the batteries themselves) must not add excessive dead weight to the module or the energy densities of the modules will suffer. Also, since the batteries generate large amounts of heat during cycling, the materials of construction should be thermally conductive and small enough not to interfere with heat transfer away from the batteries or to act as a heat sink, trapping heat within the batteries and modules. In order to meet these and other requirements the instant inventors have designed the improved, high-power battery module of the instant invention.

The battery module 32 of the instant invention includes: 1) a plurality of individual batteries 1; 2) a plurality of electrical interconnects 25 connecting the individual batteries 1 of the module 32 to one another and providing means for electrically interconnecting separate battery modules 32 to one another; and 3) a battery module bundling/compression means (described below). The batteries are bound together under external mechanical compression (the benefits of which are described below) within the module bundling/compression means such that they are secure and do not move around or dislodge when subjected to the mechanical vibrations of transport or use.

While any number of batteries may be bundled into a module, 2–15 batteries per bundle is typical. The battery modules 32 are typically bundles of prismatic batteries of the instant invention. Preferably they are bundled such that they are all oriented in the same fashion with each battery having its electrical terminals located on top (see FIGS. 9 and 12). The batteries are oriented within the module such that their narrowest sides face the sides of the module and their wider sides (those which, on expansion of the batteries, will warp) are placed adjacent to other batteries in the module. This arrangement permits expansion in only one direction within the module, which is desirable.

The batteries 1 are bound within the module bundling/compression means under external mechanical compression which is optimized to balance outward pressure due to expansion of the battery components and provide additional inward compression on the battery electrodes within each battery to reduce the distance between the positive and negative electrodes, thereby increasing overall battery power.

As discussed above, the expansion of prismatic batteries preferably used in the instant modules has been tailored to be unidirectional, therefore, compression to offset the expansion is only required in this one direction (see arrow 33 for compression direction). If not offset, this expansion will cause bowing and warpage of the battery's external case and larger separation gaps between the electrodes than optimal, thereby reducing the power of the batteries. Also, it has been found that overcompensation for the expansion is useful to a point. That is, up to a certain point, excess compression actually increases the power output (reduces the internal resistance) of the bundled batteries. However, extremely excessive compression leads to cracking and shorting of the electrodes within the batteries. The mechanism for this increased power on over compression is believed to result from compression of the positive electrode, which lowers the resistance by reducing the contact resistance between the particles of the active material in the electrode and the electrode current collector. Also, compression of the separator results in decreased interplate spacing between the positive and negative electrodes of the battery which allows for shorter ion travel paths between the electrodes, thus reducing the electrolyte resistance therebetween.

Figure 17:
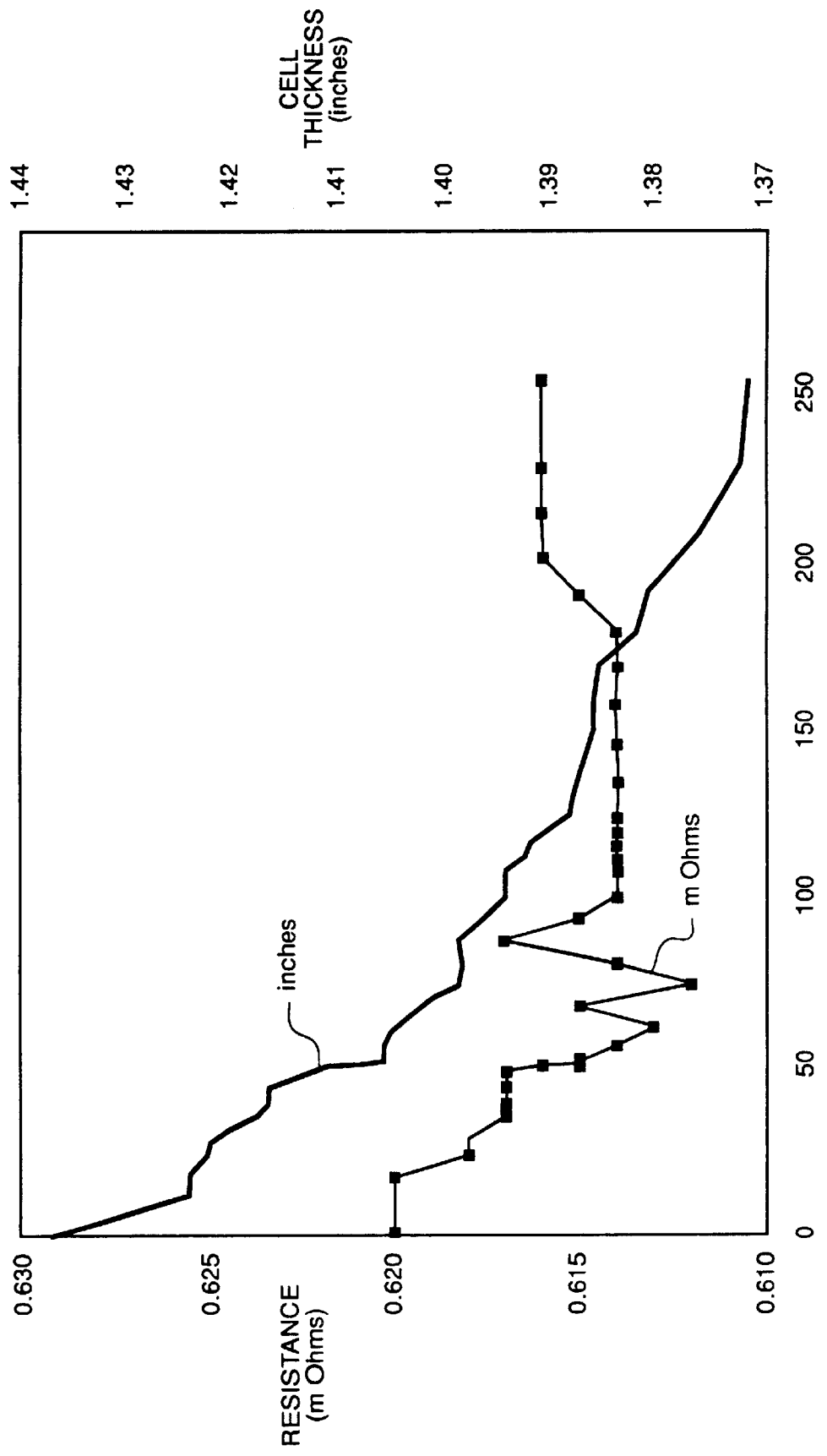
FIG. 17 is a plot of battery resistance and battery thickness versus external compression pressure, optimal and functional ranges are clearly present.

FIG. 17 shows the correlation of module compression to battery resistance. Modules having end plates (described below) were compressed using differing amounts of force and the internal battery resistance (related to total power output and charging efficiency) and battery thickness were measured. As can be seen from a perusal of FIG. 17, there is an optimal compression range for these modules between of between about 70 and 170 psi (about 1100–2600 pounds force over an area of about 100 cm$^2$) and a functional range of between about 50 to about 180 psi (about 800 to about 2800 over an area of about 100 cm$^2$). Clearly it can be seen that for these particular batteries used in this module, compression above than the upper limit and compression below the lower limit of the functional range causes an increase in internal resistance of the batteries and therefore reduced power. It should be noted that, while the optimal and functional compression ranges are different for different size batteries, the resistance versus compression plots for these different size batteries are all similar in that there are functional and optimal ranges of compression for proper cell performance.

To find a design/materials configuration which: 1) allows for application of the required compression, 2) performs the required mechanical function of vibration resistant module bundling/compression means; and 3) is as light weight as possible, is a formidable task. The instant inventors have found that the battery modules can be bound together under high mechanical compression using metal bars 34 (preferably stainless steel) which are positioned-along all four sides of the battery module 32 and are welded at the four corners of the module where the bars meet, thereby forming a band around the periphery of the battery module. Preferably the welded metal bars 34 are centrally positioned between the top and bottom of the battery module, which is where the expansion is most severe. Compression of the batteries in areas not containing the electrode stack is not useful since it does not compress the electrodes. In fact, it can be detrimental, since it results in shorting of the electrodes to the metal can, through the interior insulator.

It should be noted that, although it is not readily observable in the figures, the thickness and width dimensions at the top and bottom perimeter of the battery cases are between 0.5 and 1.0 mm smaller than the overall thickness and width dimensions. These reduced dimensions insure that all of the compressive force is translated to the electrode plate stack and separators only.

It is more preferred that the welded metal bars 34 include two or three sets of bars centrally positioned between the top and bottom of the battery module. If three sets of bars are used, a first set of bars should be disposed half way between the top and bottom of the battery module, a second set of bars is then positioned between the first set of bars and the top of the battery module, and the third set of bars is positioned between the first set of bars and the bottom of the battery module. This allows for uniform compression distribution and eases the stress on any one set of bars. This compression distribution also permits use of the smallest, lightest metal bars, thereby reducing module dead weight.

Figure 13A:
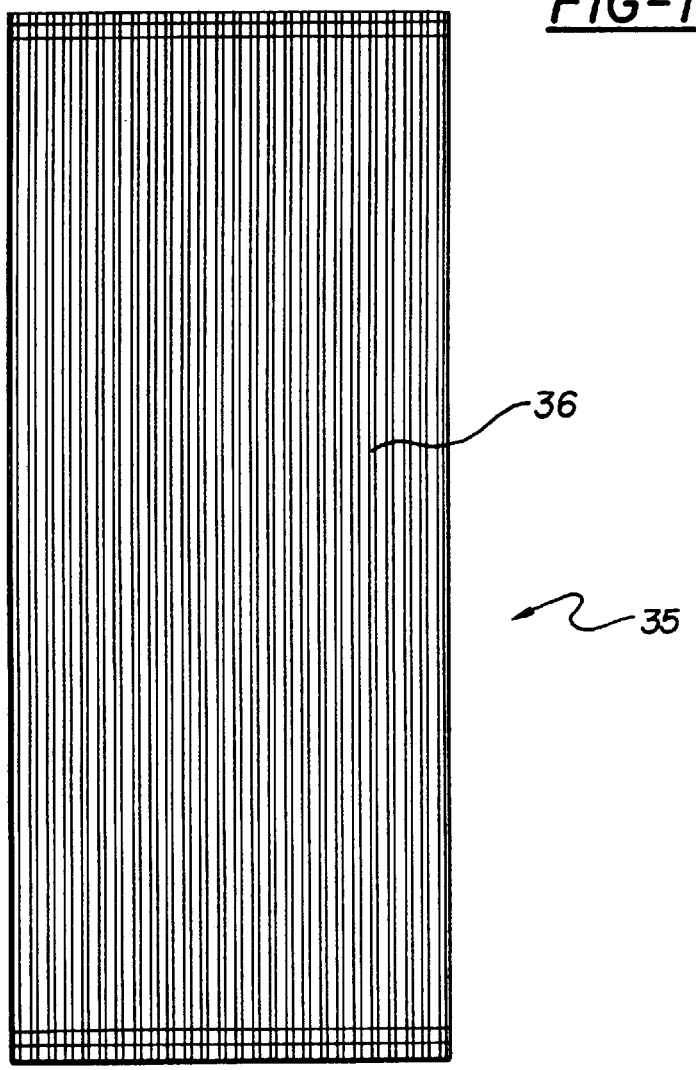
FIG. 13a is a stylized depiction of one embodiment of the end plates of the instant battery modules, specifically illustrated is a ribbed end plate.
Figure 13B:
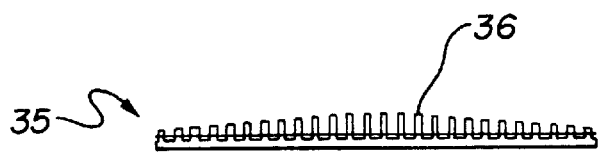

Another preferred design uses metal end plates 35 at the ends of the module. The stainless steel bars are positioned along the sides of the battery module and are welded at the corners of the module to rectangular metal tubing (45 in FIG. 9) which replaces the end bars and holds the end plates 35 in position. This design allows for an even better distribution of the compressive forces. The end plates 35 are preferably formed from aluminum and may include ribs 36 protruding perpendicular to the plane of the end plates 35, thereby providing added strength to the plates 35 and allowing for lighter materials to be used. (One embodiment of the end plates is shown in FIGS. 13a and 13b. Other embodiments are described in U.S. patent application Ser. No. 08/238,570 filed May 5, 1995 the contents of which are incorporated by reference.) When the end plates 35 have such ribbing 36, it is necessary that there are slots (not shown, but see FIG. 9) in the ribbing to accommodate the rectangular metal tubing 45. The end plates 35 may preferably be thermally isolated or insulated from the batteries bundled within the module 32 by a thermally insulating material such as a thermally insulating layer of polymer or polymer foam. This insulation prevents uneven battery temperature distribution within the module which may be caused by the cooling fin action of the ribs 36 of the end plates 35. However, the ribs 36 can provide added thermal dissipation for the batteries 1 within the module 32, if needed, by thermally sinking the end plates 35 to the adjacent batteries 1.

Each of the modules 32 may additionally include module spacers 37 (see FIGS. 11 and 12) which hold the modules 32 at a distance from any other modules 32 and from a battery pack case. These module spacers 37 are placed on the top and bottom of the module 32 to provide protection to the corners of the batteries 1 within the module 32 and the electrical interconnects 25 and terminals 7, 8 of the batteries 1. More importantly, tabs 38 on the sides of the spacers 37 hold the modules 32 at the optimal distance apart. The spacers 37 are preferably formed from a light weight, electrically non-conductive material, such as a durable polymer. Also, it is important to the overall pack energy density that the spacers include as little total material as possible to perform their required function and still be as light as possible.

Figure 14:
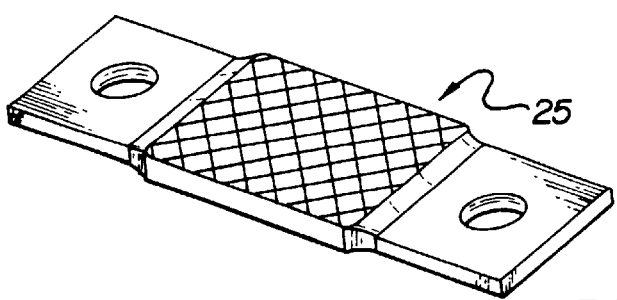
FIG. 14 is a stylized depiction of one embodiment of the braided cable interconnect useful in the modules and battery packs of the instant invention; specifically shown is a flat braided cable electrical interconnect.

The batteries and modules of the present invention are preferably electrically interconnected by conductive leads 25 (see FIGS. 8 and 9) which provide a low resistance pathway therebetween. The total resistance, including the lead resistance and the contact resistance should preferably not exceed 0.1 mohm. The leads are fastened to the terminals by a screw or bolt or preferably the socket barrel connector 24 discussed hereinabove. The electrical interconnects 25 of the battery module 32 of the instant invention are preferably braided cable interconnects (see FIG. 14), which provide for high thermal dissipation and flexibility of module design/configuration. That is, the braided cable interconnects 25 serve two important functions within the battery modules of the present invention (besides their normal function of transporting the electrical energy out of the batteries). First, the braided cable 25 is flexible which accommodates expansion and contraction of the individual batteries 1 that results in a change of distance between the terminals 7, 8 of the individual batteries within the module 32. Second, the braided cable interconnect 25 has a significantly higher surface area than a solid cable or bar. This is important to the thermal management of the batteries, modules and packs of the instant invention because the electrical interconnect is part of a thermal pathway which begins within the interior of the battery, passes up through the electrodes 4, 5, through the electrode tab 27, through the battery terminal 7, 8 and out to the electrical interconnect 25. Therefore, the higher the surface area of the electrical interconnect 25, the greater the thermal dissipation and the better the thermal management of the batteries 1. The braided cable electrical interconnects 25 are preferably formed from copper or a copper alloy which is preferably coated with nickel for corrosion resistance.

Figure 15:
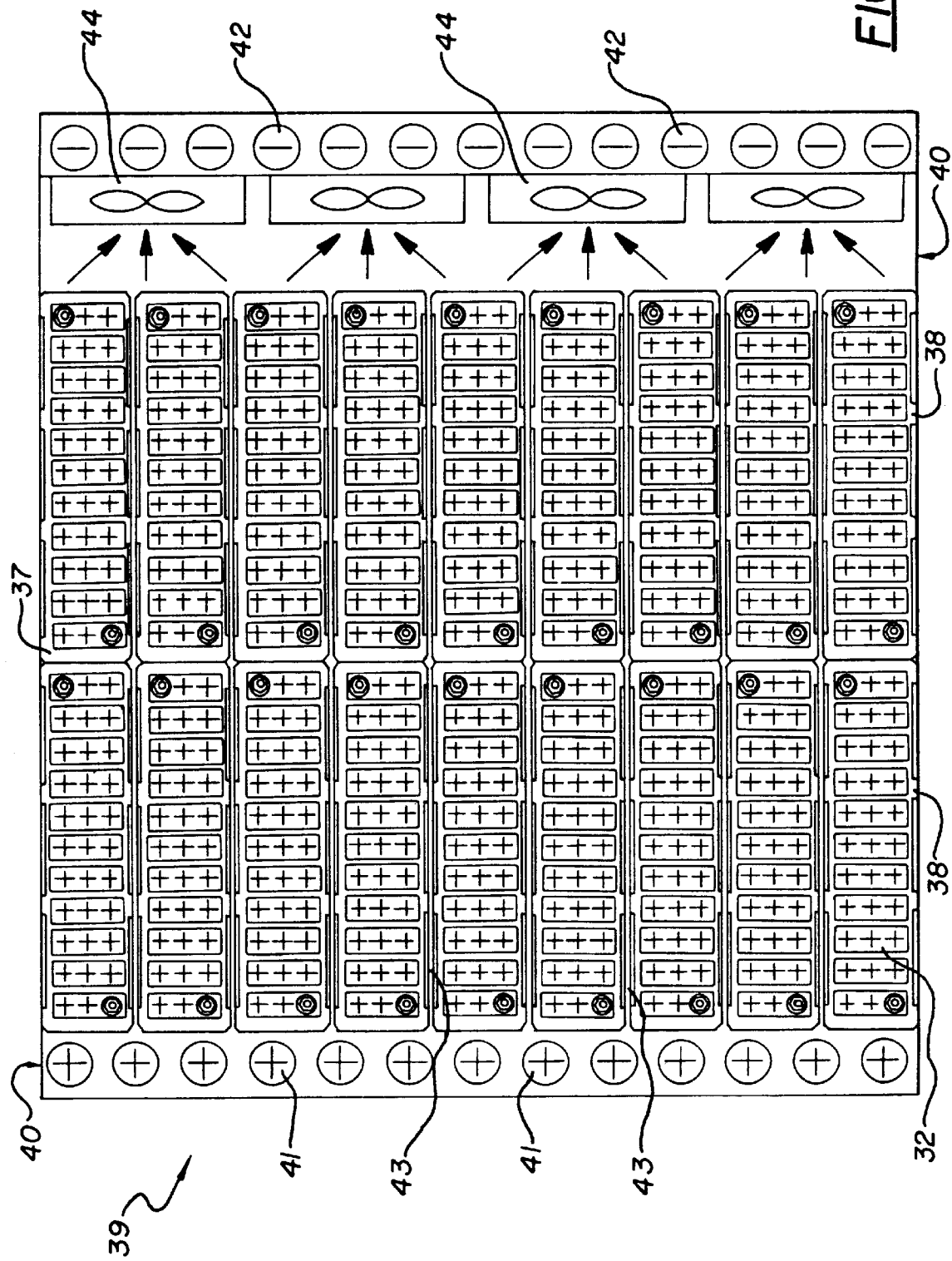
FIG. 15 is a stylized depiction of a top view of one embodiment of the fluid-cooled battery pack of the present invention, specifically illustrated is the matrix placement of the battery modules into the pack case, the manner in which the module spacers form coolant flow channels, the fluid inlet and outlet ports, and the fluid transport means.

Yet another aspect of the present invention (shown in FIG. 15) is the mechanical design of fluid-cooled battery pack systems (as used herein the terms "battery pack" or "pack" refer to two or more electrically interconnected battery modules). Again, it should be noted that during cycling of the batteries they generate large amounts of waste heat. This is particularly true during charging of the batteries. This excess heat can be deleterious and even catastrophic to the battery system. Some of the negative characteristics which are encountered when the battery pack systems have no or improper thermal management include: 1) substantially lower capacity and power; 2) substantially increased self discharge; 3) imbalanced temperatures between batteries and modules leading to battery abuse; and 4) lowered cycle life of the batteries. Therefore, it is clear that to be optimally useful the battery pack systems need proper thermal management.

Some of the factors to be considered in the thermal management of battery pack systems are 1) all batteries and modules must be kept cooler than 65° C. to avoid permanent damage to the batteries; 2) all batteries and modules must be kept cooler than 55° C. to get at least 80% of the battery's rated performance; 3) all batteries and modules must be kept cooler than 45° C. to achieve maximum cycle life; and 4) the temperature difference between individual batteries and battery modules must be kept below 8° C. for optimal performance. It should be noted that the improvements in the instant invention regulate the temperature difference between batteries to less than about 2° C.

The thermal management of the battery pack system must provide adequate cooling to insure optimal performance and durability of the Ni—MH batteries in a wide variety of operating conditions. Ambient temperatures in the U.S. lie in a wide range from at least −30° C. to 43° C. in the lower 49 states. It is necessary to achieve operational usefulness of the battery packs under this ambient temperature range while maintaining the batteries in their optimal performance range of about −1° C. to 38° C.

Nickel-metal hydride batteries show charge efficiency performance degradation at extreme high temperatures over 43° C. due to problems resulting from oxygen evolution at the nickel positive electrode. To avoid these inefficiencies the battery temperature during charge should ideally be held below 43° C. Nickel-metal hydride batteries also show power performance degradation at temperatures below about −1° C. due to degraded performance in the negative electrode. To avoid low power, the battery temperature should be held above about −1° C. during discharge.

As alluded to above, in addition to degraded performance at high and low temperatures, detrimental effects can occur as a result of temperature differentials between batteries within a module during charge. Large temperature differentials cause imbalances in charge efficiencies of the batteries, which, in turn, can produce state-of-charge imbalances resulting in lowered capacity performance and potentially leading to significant overcharge and overdischarge abuse. To avoid these problems the temperature differential between the batteries should be controlled to less than 8° C. and preferably less than 5° C.

Figure 18:
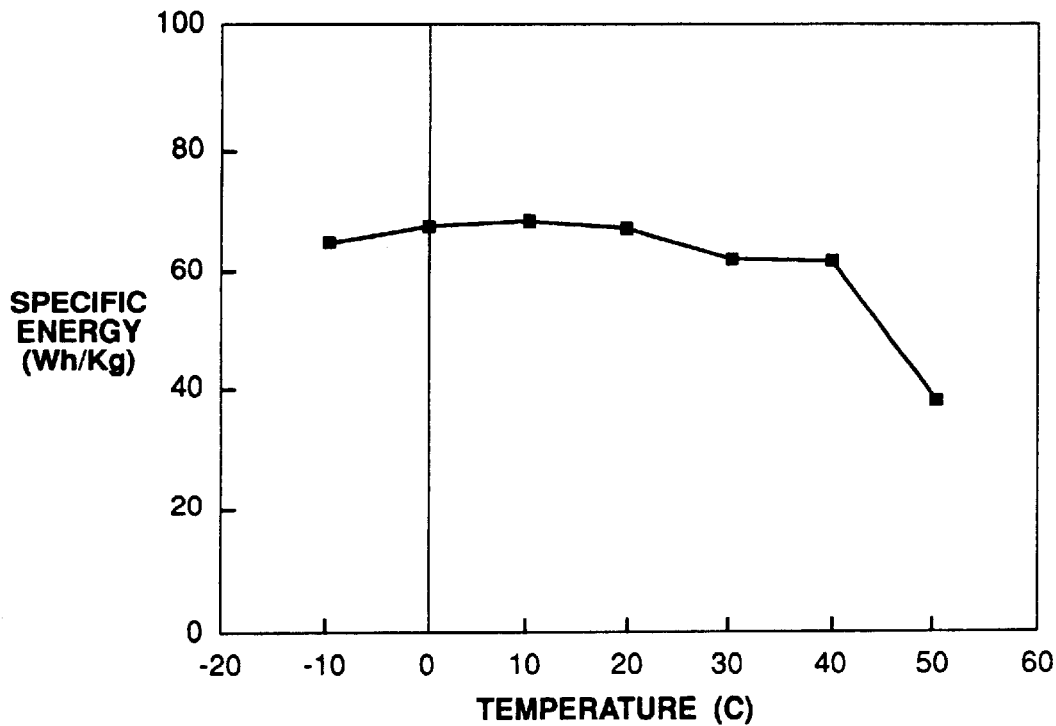
FIG. 18 illustrates the effect of temperature upon the battery's specific energy, plotting battery temperature versus specific energy in Wh/Kg.
Figure 19:
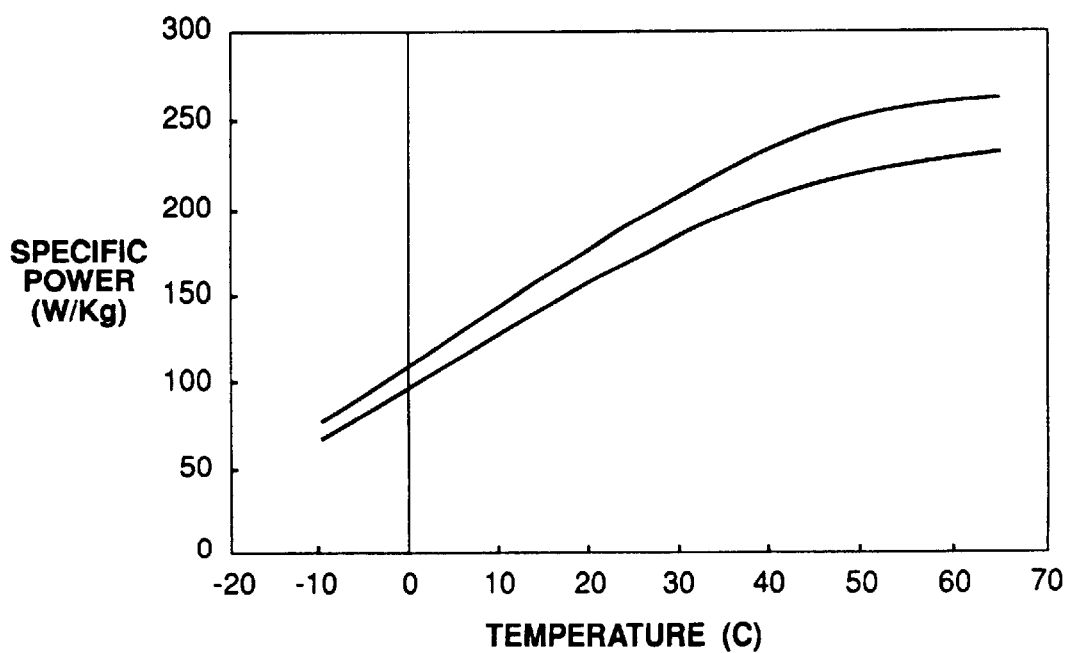
FIG. 19 illustrates the effect of temperature upon the battery's specific power, plotting battery temperature versus specific power in W/Kg.

FIG. 18 shows the relationship between battery specific energy measured in Wh/Kg and the battery temperature for nickel-metal hydride batteries of the instant invention. As can be seen, the specific energy of the battery starts to fall off beyond about 20° C. or so and drops drastically beyond about 40° C. FIG. 19 shows the relationship between battery specific power measured in W/Kg and the battery temperature for nickel-metal hydride batteries of the instant invention. As can be seen, the specific power of the battery risis with temperature but levels off above about 40° C.

Other factors in the design of a fluid-cooled battery pack system include mechanical considerations. For instance, battery and module packing densities must be as high as possible to conserve space in the end product. Additionally, anything added to the battery pack system to provide for thermal management ultimately reduces the overall energy density of the battery system since it does not contribute directly to the electrochemical capacity of the batteries themselves. In order to meet these and other requirements the instant inventors have designed the fluid-cooled battery pack system of the instant invention.

In its most basic form (an embodiment shown in FIG. 15) the instant fluid-cooled battery pack system 39 includes: 1) a battery-pack case 40 having at least one coolant inlet 41 and at least one coolant outlet 42; 2) at least one battery module 32 disposed and positioned within the case 40 such that the battery module 32 is spaced from the case walls and from any other battery modules 32 within the case 40 to form coolant flow channels 43 along at least one surface of the bundled batteries, the width of the coolant flow channels 43 is optimally sized to allow for maximum heat transfer, through convective, conductive and radiative heat transfer mechanisms, from the batteries to the coolant; and 3) at least one coolant transport means 44 which causes the coolant to enter the coolant inlet means 41 of the case 40, to flow through the coolant flow channels 43 and to exit through the coolant outlet means 42 of the case 40. Preferably, and more realistically, the battery pack system 39 includes a plurality of battery modules 32, typically from 2 to 100 modules, arranged in a 2 or 3 dimensional matrix configuration within the case. The matrix configuration allows for high packing density while still allowing coolant to flow across at least one surface of each of the battery modules 32.

The battery-pack case 40 is preferably formed from an electrically insulating material. More preferably the case 40 is formed from a light weight, durable, electrically insulating polymer material. The material should be electrically insulating so that the batteries and modules do not short if the case touches them. Also, the material should be light weight to increase overall pack energy density. Finally, the material should be durable and capable of withstanding the rigors of the battery pack's ultimate use. The battery pack case 40 includes one or more coolant inlets 41 and outlets 42, which may be specialized fluid ports, where required, but are preferably merely holes in the battery pack case 40 through which cooling-air enters and exits the battery pack.

The fluid cooled battery-pack system 39 is designed to use electrically-insulating coolant, which may be either gaseous or liquid. Preferably the coolant is gaseous and more preferably the coolant is air. When air is used as the coolant, the coolant transport means 44 is preferably a forced-air blower, and more preferably a blower which provides an air flow rate of between 1–3 SCFM of air per cell in the pack.

Figure 16:
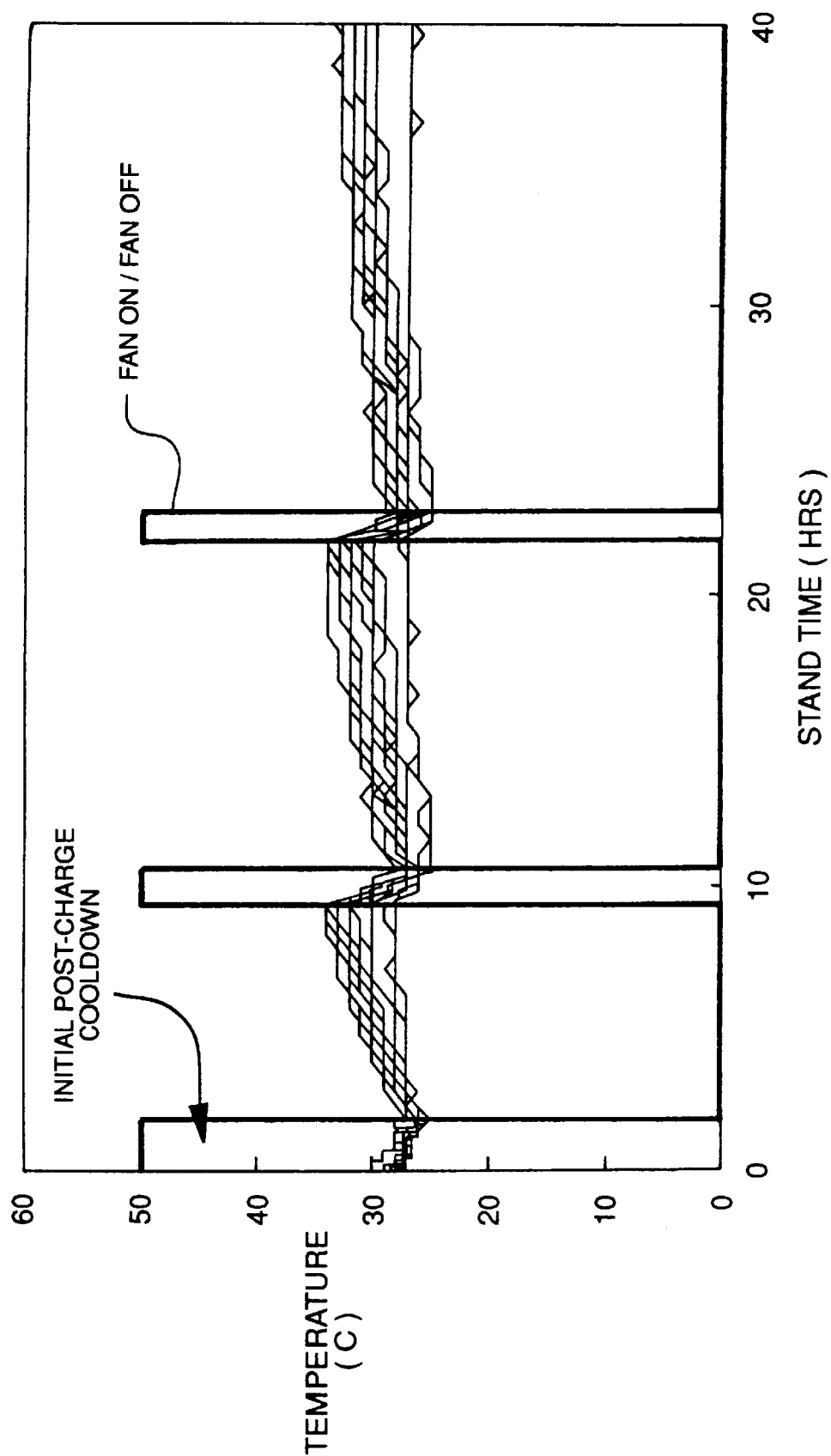
FIG. 16 is plot of battery temperature versus stand time indicating the manner in which temperature controlled fan algorithms affect the battery temperature during pack self discharge.

The blowers do not need to continuously force cooling air into the battery pack, but may be controlled so as to maintain the battery pack temperatures within the optimal levels. Fan control to turn the fan on and off and preferably to control the speed of the fan is needed to provide for efficient cooling during charging, driving, and idle stands. Typically, cooling is most critical during charge, but is also needed during aggressive driving. Fan speed is controlled on the basis of the temperature differential between the battery pack and ambient, as well as on the basis of absolute temperature, the latter so as not to cool the battery when already it is already cold or so as to provide extra cooling when the battery nears the top of its ideal temperature range. For nickel-metal hydride batteries, fans are also needed in idle periods after charge. Intermittent cooling is needed to provide for efficient cooling under this condition and results in net energy savings by keeping self discharge rates below fan power consumption. A typical result (FIG. 16) shows a fan on time of 2.4 hours after the initial post charge cooldown. Typically the normal fan control procedure (described below) works well in this scenario. Fan control allows for the use of powerful fans for efficient cooling when needed without the consumption of full fan power at all times, thus keeping energy efficiency high. The use of more powerful fans is beneficial in terms of maintaining optimal pack temperature which aids in optimization of pack performance and life.

One example of a fan control procedure provides that, if the maximum battery temperature is over 30° C. and the ambient temperature is lower (preferably 5° C. or more lower) than the maximum battery temperature then the fans will turn on and circulate cooler air into the coolant channels.

Another useful fan control algorithm operates the fans at variable rates depending upon certain criterion. These criterion include 1) maximum battery temperature; 2) ambient temperature; 3) present battery usage (i.e. charging, charge waiting, high temperature, high depth-of-discharge (dod) while driving, standing, etc.); 4) voltage of any auxiliary battery which powers the coolant fans. This algorithm is shown in Table 2.

TABLE 2

```
IF (Tbatmax >= 25° C.)
   THEN
       PWM = Minspeed + 5*Delta
       PWM = MIN(PWM,Maxspeed)
ELSE PWM = Minspeed
IF PWM < 30 THEN PWM = 0
IF (Vauxbat < 13) and (PWM >= 30)
THEN PWM = 30
```

In the Algorithm of Table 2:
"Tbatmax" is the maximum module temperature;
"Tamb" is the ambient air temperature;
"Delta" is Tbatmax-Tamb (with negative values taken as zero)
"PWM" is the fan percentage pulse width modulation (PWM) control signal (0 = OFF, 100 = FULL POWER);
"Vauxbat" is the Auxiliary fan battery voltage;
"Minspeed" is the minimum fan speed, 30% PWM if charging, charge waiting, high temperature, high depth of discharge (dod) while driving; or 0% PWM otherwise; and
"Maxspeed" is the maximum fan speed, 100% PMW if charging or charge waiting, or 65% PMW otherwise.

The flow rate and pressure of the cooling fluid needs to be sufficient to provide sufficient heat capacity and heat transfer to cool the pack. The flow rate of the fluid needs to be sufficient to provide for steady state removal of heat at the maximum anticipated sustained heat generation rate to result in an acceptable temperature rise. In typical Ni—MH battery packs, with 5–10 W per cell generated during overcharge (maximum heat generation), a flow rate of 1–3 CFM of air per cell is needed to provide adequate cooling simply on the basis of the heat capacity of air and achieving an acceptable temperature rise. Radial blower type fans may be used to provide the most effective airflow for thermal management. This is due to the higher air pressure generated by these fan types as contrasted with that generated by axial fans. Generally, a pressure drop of at least 0.5" of water is required at the operating point of the fan as installed in the pack. To produce this pressure drop at high flow rates generally requires a fan static pressure capability of 1.5" to 3" of water.

In addition to using the fans to cool the battery pack when it is hot, the fans can heat the battery pack when it is too cold. That is, if the battery pack is below its minimum optimal temperature, and the ambient air is warmer than the battery pack, the fans may be turned on to draw warmer ambient air into the battery pack. The warmer air then transfers its thermal energy to the battery pack and warms it to at least the low end of the optimal range of temperature.

One or more coolant transport means 44 can be positioned at the coolant inlet 41 to force fresh coolant into the battery pack case 40, through coolant flow channels 43, and out of the coolant outlet 42. Alternatively, one or more coolant transport means 44 can be positioned at the coolant outlet 42 to draw heated coolant out of the battery pack case 40, causing fresh coolant to be drawn into the battery pack case 40 via the coolant inlet 41, and to flow through the coolant flow channels 43.

The coolant may flow parallel to the longest dimension of the coolant flow channels 43 (i.e. in the direction of the length of the battery modules) or, alternatively, it may flow perpendicular to the longest dimension of said coolant flow channels 43, (i.e. in the direction of the height of the battery module). It should be noted that since the coolant withdraws the waste heat from the batteries as it flows through the cooling channels 43, the coolant heats up. Therefore, it is preferable that the fluid flow perpendicular to the longest dimension of the cooling channels 43. This is because as the coolant heats up, the temperature difference between the batteries and the coolant decreases and therefore, the cooling rate also decreases. Thus the total heat dissipation is lowered. To minimize this effect, the coolant flow path should be the shorter of the two, i.e. along the height of the batteries.

While air is the most preferred coolant (since it is readily available and easy to transport into and out of the case) other gases and even liquids may be used. Particularly, liquid coolants such as freon or ethylene glycol, as well as other commercially available fluorocarbon and non-fluorocarbon based materials may be used. When these other gases or liquids are used as the coolant, the coolant transport means 44 may preferably be a pump. When using coolants other than air, the coolant transport means may preferably include a coolant return line attached to the coolant outlet 42 which recycles heated coolant to a coolant reservoir (not shown) from which it is transferred to a coolant heat exchanger (not shown) to extract heat therefrom and finally redelivered to the coolant pump 44 for reuse in the cooling of the battery pack 39.

The optimized coolant flow channel width incorporates many different factors. Some of these factors include the number of batteries, their energy density and capacity, their charge and discharge rates, the direction, velocity and volumetric flow rate of the coolant, the heat capacity of the coolant and others. It has been found that independent of most of these factors, it is important to design the cooling channels 43 to impede or retard the cooling fluid flow volume as it passes between the modules. Ideally, the retardation in flow is predominantly due to friction with the cell cooling surfaces, which results in a flow reduction of 5 to 30% in flow volume. When the gaps between modules form the major flow restriction in the cooling fluid handling system, this produces a uniform and roughly equal cooling fluid flow volume in the gaps between all modules, resulting in even cooling, and reducing the influence of other flow restrictions (such as inlets or exits) which could otherwise produce nonuniform flow between the modules. Furthermore, the same area of each cell is exposed to cooling fluid with similar velocity and temperature.

Battery modules are arranged for efficient cooling of battery cells by maximizing the cooling fluid velocity in order to achieve a high heat transfer coefficient between the cell surface and the cooling fluid. This is achieved by narrowing the intermodule gap to the point that the cooling fluid volumetric flow begins to diminish, but the fluid velocity is still increasing. The narrower gap also helps raise the heat transfer coefficient as the shorter distance for heat transfer in the cooling fluid raises the cell to fluid temperature gradient.

The optimal coolant flow channel width depends on the length of the flow path in the direction of flow as well as on the area of the coolant flow channel in the plane perpendicular to the flow of the coolant. There is a weaker dependence of optimal gap on the fan characteristics. For air, the width of the coolant flow channels 43 is between about 0.3–12 mm, preferably between 1–9 mm, and most preferably between 3–8 mm. For vertical air flow across a module 7 inches high, the optimal achievable mean module spacing (width of the coolant flow channels 43) is about 3–4 mm (105 mm centerline spacing). For horizontal air flow lengthwise across 4 modules 16 inches long in a row for a total distance of 64 inches, the optimal achievable mean module spacing (width of the coolant flow channels 43) is about 7–8 mm (109 mm centerline spacing). Slightly closer intermodule spacing at the far end of this row will result in a higher airflow rate and consequently a higher heat transfer coefficient, thus compensating for the higher air temperature downstream. A secondary inlet or series of inlets partway along the horizontal coolant flow path can also be used as a means of introducing additional coolant, thus making the heat transfer between the battery cells and the coolant more uniform along the entire flow path.

In should be noted that the term "centerline spacing" is sometimes used synonymously with coolant flow channel width. The reason for this is that the quoted coolant flow channel widths are average numbers. The reason for this averaging is that the sides of the battery modules which form the flow channels 43 are not uniformly flat and even, the banding which binds the modules together and the sides of the batteries themselves cause the actual channel width to vary along its length. Therefore, it is sometimes easier to describe the width in terms for the spacing between the centers of the individual modules, i.e. the centerline width, which changes for batteries of different sizes. Therefore, it is generically more useful to discuss an average channel width, which applies to battery modules regardless of the actual battery size used therein.

Figure 20:
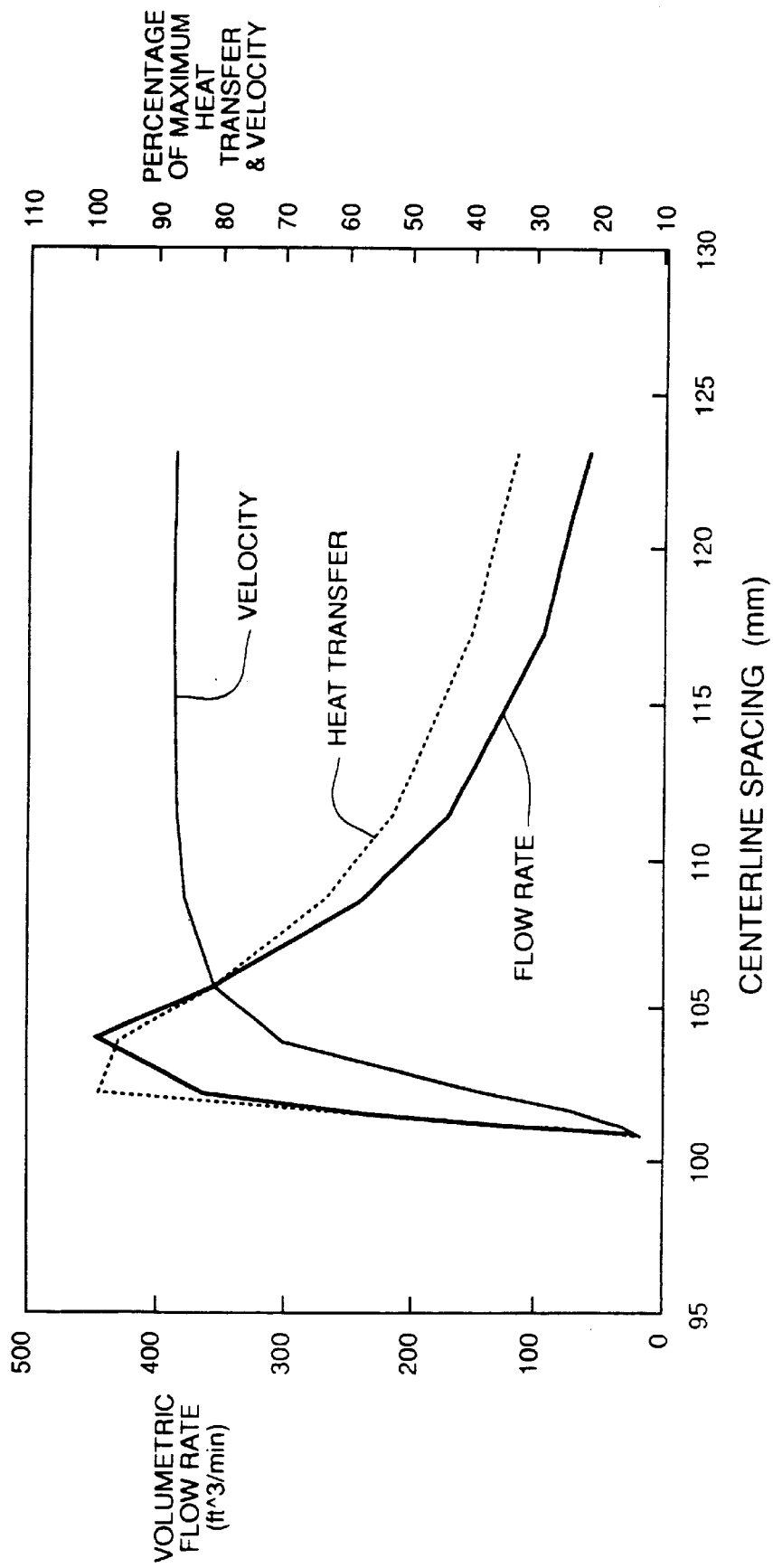
FIG. 20 is a plot of coolant volumetric flow rate and the percentage of maximum heat transfer and coolant velocity versus centerline spacing (related to average coolant channel width) for horizontal coolant flow through the coolant flow channels.

FIG. 20 plots the relationship between the coolant flow channel width (i.e. centerline spacing) verses the coolant volumetric flow rate, percentage of maximum coolant velocity and percentage of maximum heat transfer for horizontal coolant flow, the graph for vertical fluid flow has also been plotted but is not included herein. The graph is for air as the coolant and assumes turbulent flow and a 30% free air restriction. It should be noted that there are clearly optimal spacings, which differ dependent upon the direction of coolant flow. It is most efficient to operate within a range of ±10% of optimal heat transfer, however if needed, the system can be operated outside of this range by increasing the volumetric flow rate of the coolant. In the figure, the curve denoted by the squares(■) represents the volumetric flow rate of the coolant(air) and is read from the left hand ordinate, while the curves denoted by the triangles (▲) and the diamonds (♦) represent the percentage of maximum heat transfer and percentage of maximum coolant flow velocity, respectively, and are read from the right hand ordinate.

To assist in achieving and maintaining the proper spacing of the modules within the pack case and to provide electrical isolation between the modules, each module includes coolant-flow-channel spacers 37 which hold the modules 32 at the optimal distance from any other modules 32 and from the battery pack case 40 to form the coolant flow channels 43. As disclosed above, the coolant-flow-channel spacers 37 are preferably positioned at the top and bottom of the battery modules 32, providing protection to the corners of the modules 32, the battery terminals 7, 8 and the electrical interconnects 25. More importantly, tabs on the sides of the spacers 38 hold the modules at the optimal distance apart. The spacers 37 are preferably formed from a light weight, electrically non-conductive material, such as a durable polymer. Also, it is important to the overall pack energy density that the spacers include as little total material as possible to perform the required function and still be as light as possible.

As mentioned above Ni—MH batteries operate best in a specific temperature range. While the cooling system described above enables the battery pack systems of the instant invention to maintain operating temperatures lower than the high temperature limit of the optimal range (and sometimes to operate above the lower temperature limit of the optimal range, if the ambient air temperature is both warmer than the battery and warmer than the lower temperature limit of the optimal range), there are still times when the battery system will be colder than the lower limit of optimal temperature range. Therefore, there is a need to somehow provide variable thermal insulation to some or all or of the batteries and modules in the battery pack system.

In addition to the cooling systems described above, another way to thermally control the battery pack systems of the instant invention is by the use of temperature dependant charging regimens. Temperature dependent charge regimens allow for efficient charging under a variety of ambient temperature conditions. One method involves charging the batteries to a continuously updated temperature dependent voltage lid which is held until the current drops to a specified value after which a specified charge input is applied at constant current. Another method involves a series of decreasing constant current or constant power steps to a temperature compensated voltage limit followed by a specified charge input applied at a constant current or power. Another method involves a series of decreasing constant current or constant power steps terminated by a maximum measured rate of temperature rise followed by a specified charge input applied at a constant current or power. Use of temperature dependent voltage lids ensures even capacity over a wide range of temperatures and ensures that charge completion occurs with minimal temperature rise. For example, use of fixed voltage charge lids results in an 8° C. temperature rise in one case where use of temperature compensated charging resulted in a 3° C. temperature rise under similar conditions. Absolute charge temperature limits (60° C.) are required for this battery to avoid severe overheating which can occur in the case of simultaneous failure of charger and cooling system. Detection of rate of change of voltage with respect to time (dV/dt) on a pack or module basis allows a negative value of dV/dt to serve as a charge terminator. This can prevent excessive overcharge and improves battery operating efficiency as well as serving as an additional safety limit.

An example of a temperature dependant charging regimen is presented in Table 3.

TABLE 3

1) Charge at maximum power until voltage lid*[4] is reached.*[1,2,3]
2) Reduce current by 30% and charge until voltage lid*[4] is reached.*[1,2,3]
3) Repeat step 2) until current is ≤5A.*[1,2,3]
4) Complete charge at 5A constant current charge for one hour if Ampere-hour recharge is greater than 5 Ah.*[1,2,3]
5) Restart the charge every 2 hours, or every X hours (see below for an illustrative equation for X)*[5]. Alternatively restart the charge if the battery module voltage falls below 15V, or alternatively restart the charge if the battery voltage falls below the voltage lid minus an offset (e.g. 0.5V per module) or alternatively float the battery at the voltage lid minus the above offset. In all the above cases, the maximum battery temperature must be less than 50 C. prior to restarting charge.
*1) Current must be limited to 10A if the maximum battery temperature is greater than 40° C.
*2) Halt charge if the maximum battery temperature is greater than 60° C. - only restart charge if the maximum battery temperature falls below 50° C.
*3) Limit total charge to a maximum of 95 Ah for initial charge or 30 Ah for restarts.

*4) $\left(16.65V - \left[\frac{0.024V}{C}\right] * \text{Max battery temp. (° C.)}\right)*$

*5) e.g. X = 20*(1-Min. Acceptable State of Charge(%))$^2$*(60-Max. Battery Temp.)

Figure 21:
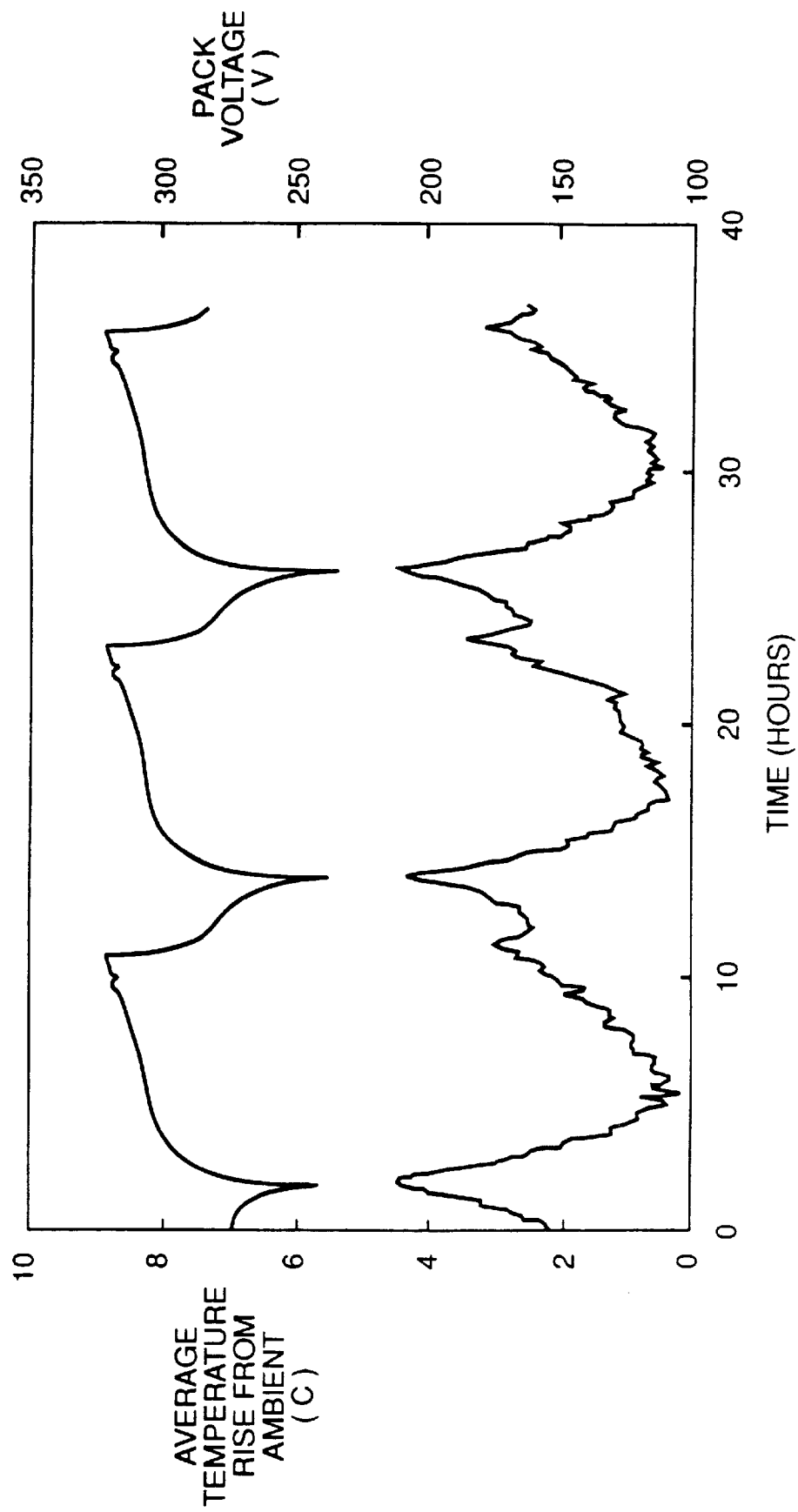
FIG. 21 is a plot of temperature rise from ambient and pack voltage versus time during charge and discharge cycles using a "temperature compensated voltage lid" charging method.
Figure 22:
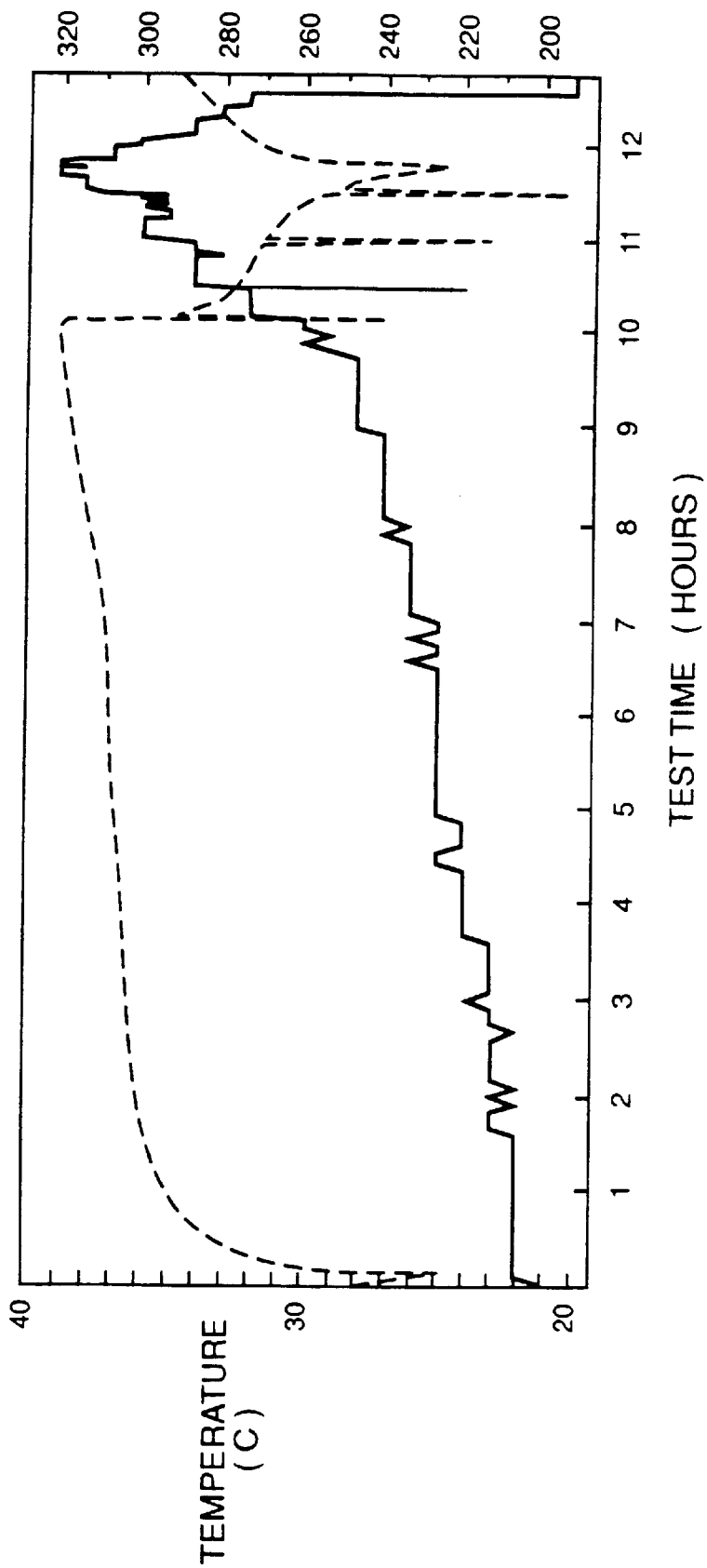
FIG. 22 is a plot of temperature rise from ambient and pack voltage versus time during charge and discharge cycles using a "fixed voltage lid" charging method.

FIGS. 21 and 22 illustrate how "temperature compensated voltage lid" charging regimens can reduce temperature rise during charging of the battery pack systems. These figures plot the temperature rise of a battery pack and the pack voltage versus time during charge and discharge of the pack. In FIG. 21 (temperature compensated voltage lid), the upper curve represents pack voltage and the lower curve represents pack temperature above ambient. FIG. 21 indicates that at the end of the charge cycle, indicated by the peak of the voltage curve, the battery pack only experienced a 3° C. temperature rise above ambient. By contrast, FIG. 22 indicates an 8° C. temperature rise from ambient when employing a "fixed voltage lid" charging method. Here the dashed curve represents pack voltage and the solid curve represents pack temperature. Therefore, it can be seen that much of the conventional charge generated heat has been eliminated by the use of a "temperature compensated voltage lid" charging regimen.

As discussed above, in addition to having an upper limit on the operational temperature range of the instant batteries, there is also a lower limit. As also discussed above, when the ambient temperature is above the battery temperature, the "cooling system" can be used as a heating system. However, it is much more likely that if the battery pack temperature is low, the ambient temperature will also be low, and probably lower than the battery pack temperature. Therefore, there will be times during operational use of the battery pack system when it will be advantageous to thermally insulate the batteries from the ambient. However, the need for thermal insulation will not be constant and may vary dramatically in only a matter of a very short time period. Therefore, the thermal insulation need will also be variable.

In order to accommodate this variable need for thermal insulation, the instant inventors have devised a means for providing variable thermal insulation. The inventive variable thermal insulation means can be used on individual batteries, battery modules and battery pack systems alike.

In its most basic form, the means provides variable thermal insulation to at least that portion of the rechargeable battery system which is most directly exposed to said ambient thermal condition, so as to maintain the temperature of the rechargeable battery system within the desired operating range thereof under variable ambient conditions.

To provide this variable thermal insulation, the inventors have combined temperature sensor means, compressible thermal insulation means and a means to compress the compressible thermal insulation means in response to the temperature detected by the thermal sensor. When the temperature sensor indicates that the ambient is cold, the thermal insulation is positioned in the needed areas to insulated the affected areas of the battery, module or battery pack system. When the ambient is warmer, the temperature sensor causes the thermal insulation to be partly or wholly compressed such that the insulation factor provided to the battery system by the compressible insulation is partially or totally eliminated.

The thermal sensors may be electronic sensors which feed information to piston devices which variably increases or decreases the compression upon a compressible foam or fiber insulation. Alternatively, (and more preferably from an electrical energy utilization and mechanical reliability point of view,) the sensor and compression devices may be combined in a single mechanical devices which causes variable compression upon the thermal insulation in direct reaction to the ambient thermal condition. Such a combined sensor/compression device and be formed from a bimetallic material such as the strips used in thermostats. Under low ambient temperatures, the bimetal device will allow the thermal insulation to expand into place to protect the battery system from the cold ambient conditions, but when the temperature of the battery or ambient rises, the bimetal device compresses the insulation to remove its insulating effect from the battery system.

While the variable thermal insulation can be used to completely surround the entire battery, module or battery pack system, it is not always necessary to do so. The variable thermal insulation can be just as effective when it only insulates the problems spots of the system. For example, in the battery modules and pack systems of the instant invention, which employ ribbed end plates, it may only be necessary to thermally insulate the ends of the modules which are most directly influenced by low temperature ambient conditions. These ambient conditions may cause large temperature imbalances between the batteries of the module(s) and as a result degrade the performance of the module or pack system. By providing variable insulation to the affected end(s) of the module(s) the temperature differential between the batteries can be reduced or eliminated and the overall temperature of the module(s) can be controlled. Finally, it should also be noted that the thermal insulation does not necessarily need to touch the batteries or modules but can be spaced apart from the modules and leave a dead air zone near the battery or module which acts as an additional thermal insulation.

The disclosure set forth herein is presented in the form of detailed embodiments described for the purpose of making a full and complete disclosure of the present invention, and such details are not to be interpreted as limiting the true scope of the invention as set forth and defined in the claims below.

We claim:

1. A battery module, said battery module including:
   a plurality of individual batteries;
   a plurality of electrical interconnects, said interconnects electrically interconnecting the individual batteries of said module to one another and providing means for electrically interconnecting separate battery modules to one another; and
   a battery module bundling/compression means, said batteries being bound together within said bundling/compression means such that said plurality of batteries are secure and do not move or dislodge when subjected to the mechanical vibrations of transport or use;
   said batteries being bound within said bundling/compression means under external mechanical compression, wherein said external mechanical compression is optimized to balance outward pressure due to expansion of the of the battery components and provide additional inward compression on the battery electrodes within each battery to reduce the distance between the positive and negative electrodes, thereby increasing overall battery power by optimally reducing the internal resistance thereof.

2. The battery module of claim 1, wherein said battery modules are bound together under external mechanical compression using metal bars which are positioned along all four sides of the battery module and are welded at the four corners of the module where the bars meet, thereby forming a band around the periphery of the battery module.

3. The battery module of claim 2, wherein said welded metal bars are centrally positioned between the top and bottom of the battery module.

4. The battery module of claim 3, wherein said welded metal bars includes three sets of bars centrally positioned between the top and bottom of the battery module, a first set of bars disposed half way between the top and bottom of the battery module, a second set of bars being positioned between said first set of bars and the top of the battery pack, and the third set of bars being positioned between said first set of bars and the bottom of the battery pack.

5. The battery module of claim 2, wherein said battery modules are bound together under a mechanical compression of about 50–180 psi.

6. The battery module of claim 4, wherein said battery modules are bound together under external mechanical compression using metal bars which are positioned along two sides of the battery module and are welded at the corners of the module to metal tubing which retains endplates over the ends of the modules.

7. The battery module of claim 6, wherein said end plate includes ribs protruding perpendicular to the plane of said endplates, thereby providing added strength to said endplates, and slots for said metal tubing.

8. The battery module of claim 6, wherein said endplates are thermally isolated from said batteries bundled within said module.

9. The battery module of claim 7, wherein said ribs provide added thermal dissipation for said batteries within said module.

10. The battery module of claim 1, wherein each of said battery modules includes module spacers which hold the modules at a distance from any other modules and from a battery pack case.

11. The battery module of claim 10, wherein said module spacers are formed of an electrically non-conductive material.

12. The battery module of claim 11, wherein said module spacers are additionally designed to cover the electrical terminals of the batteries within said module.

13. The battery module of claim 1, wherein said electrical interconnects are braided cable interconnects, which provide for high thermal dissipation and flexibility of module design/configuration.

14. The battery module of claim 13, wherein said braided cable electrical interconnects are formed from copper, copper alloy, nickel coated copper or nickel coated copper alloy.

15. The battery module of claim 7, wherein said battery modules are bundles of prismatic batteries.

16. The battery module of claim 15, wherein said battery modules are bundles of prismatic batteries which are all oriented in the same fashion with each battery having its electrical terminals located on the top thereof.

17. The battery module of claim 15, wherein said battery modules comprise bundles of 2–15 prismatic batteries per module.

18. The battery module of claim 1, wherein said battery modules comprise bound metal hydride batteries.

19. The battery module of claim 18, wherein said battery modules are bound prismatic metal hydride batteries.

20. The battery module of claim 1, wherein said batteries include:
   a battery case, said battery case including a positive battery electrode terminal and a negative battery electrode terminal;
   at least one positive electrode disposed within said battery case and electrically connected to said positive electrode terminal;
   at least one negative electrode disposed within said battery case and electrically connected to said negative electrode terminal;
   at least one separator disposed between said positive and negative electrodes within said battery case, said separator electrically insulating said positive electrode from said negative electrode, but still allowing for chemical interaction between said positive and negative electrodes; and battery electrolyte disposed within said battery case, said battery electrolyte surrounding and wetting said at least one positive electrode, said at least one negative electrode, and said at least one separator;

said battery case being prismatic in shape and having a thickness to width to height aspect ratio which is optimized to provide for maximum capacity and power output thereof.

21. The battery module of claim 20, wherein said battery case is formed from a material which is thermally conductive, mechanically strong and rigid, and resistant to corrosion.

22. The battery module of claim 21, wherein said battery case is formed from metal.

23. The battery module of claim 22, wherein said metal battery case is formed from a stainless steel.

24. The battery module of claim 20, wherein said case is includes a case top which includes said positive battery electrode terminal and said negative battery electrode terminal, and a battery case can into which said electrodes are disposed.

25. The battery module of claim 24, wherein said case top includes an annular shroud defining the periphery of at least one opening through said top and said terminals have a sealing lip around their circumference, said terminals crimp sealed into said annular shroud at said sealing lip.

26. The battery module of claim 25, wherein said case top, said case can, and said annular shroud are formed of 304L stainless steel.

27. The battery module of claim 25, wherein an elastomeric, dielectric seal is positioned between said sealing lip and said annular shroud.

28. The battery module of claim 27, wherein said elastomeric, dielectric seal is formed of a hydrogen impermeable polysulfone material.

29. The battery module of claim 20, wherein at least one of said terminals includes a pressure vent for releasing internal pressure of the battery to the surrounding atmosphere.

30. The battery module of claim 29, wherein said pressure vent is affixed in an opening through said case top.

31. The battery module of claim 30, wherein said pressure vent includes:

a vent housing having a hollow interior area in gaseous communication with said surrounding atmosphere and the interior of said case via said opening, a pressure release piston positioned within said hollow interior area, said pressure release piston sized to seal said axial opening and having a seal groove on its surface opposite said axial opening;

an elastomeric, dielectric seal mounted within said seal groove, said seal groove configured to encapsulate all but one surface of said seal, thereby leaving the non-encapsulated surface of said seal exposed; and a compression spring positioned to urge said pressure release piston to compress said seal in said seal groove and block said axial opening in said terminal.

32. The battery module of claim 31, wherein said elastomeric, dielectric seal is formed of a hydrogen impermeable polysulfone material.

33. The battery module of claim 20, further including at least one comb forming an electrical connection between internal electrode tabs and said terminals.

34. The battery module of claim 33, wherein said at least one comb is an electrically conductive bar having multiple parallel slots into which said internal electrode tabs are friction fit.

35. The battery module of claim 34, wherein said at least one comb is formed of copper, copper alloy, nickel coated copper or nickel coated copper alloy.

36. The battery module of claim 20, wherein said terminals are formed of copper, copper alloy, nickel coated copper or nickel coated copper alloy.

37. The battery module of claim 20, wherein said at least one battery electrode separator disposed between said positive and negative electrodes includes separators surrounding each electrode.

38. The battery module of claim 20, wherein said separators are formed from polypropylene having an oriented grain or groove structure.

39. The battery module of claim 38, wherein said separators are positioned so said oriented grain or groove structure is aligned along the height direction of said at least one positive electrode and said at least one negative electrode.

40. The battery module of claim 20, wherein said metal prismatic battery case is electrically insulated from the environment by a non-conductive polymer coating.

41. The battery module of claim 40, wherein said non-conductive polymer coating is a layer of electrically insulating polymer tape.

42. The battery module of claim 20, wherein said positive and negative battery electrodes are disposed in said case such that their respective electrical collection tabs are disposed opposite one another at the top of said case.

43. The battery module of claim 42, wherein said positive and negative battery electrodes have notched corners where the opposite polarity electrode electrical collection tabs are located, thereby avoiding shorts between the electrodes and eliminating unused, dead-weight electrode material.

44. The battery module of claim 20, wherein said battery includes 19 positive electrodes and 20 negative electrodes alternatingly disposed within said case.

45. The battery module of claim 22, wherein the interior of said metal prismatic battery case is electrically insulated from the electrodes and electrolyte.

46. The battery module of claim 45, wherein the interior of said metal prismatic battery case is electrically insulated from the electrodes and electrolyte by a coating of electrically insulating polymer material on the interior of said battery case.

47. The battery module of claim 45, wherein the interior of said metal prismatic battery case is electrically insulated from the electrodes and electrolyte by placing the electrodes and electrolyte in a polymer bag which is sealed and inserted into the battery case.

48. The battery module of claim 20, wherein said negative electrodes are formed from thermally conductive sintered metal hydride electrode material.

49. The battery of claim 48, wherein said thermally conductive sintered metal hydride electrodes are in thermal contact with the battery case.

* * * * *